United States Patent
Hashimoto

(10) Patent No.: US 9,753,258 B2
(45) Date of Patent: Sep. 5, 2017

(54) IMAGING LENS COMPOSED OF SEVEN OPTICAL ELEMENTS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita (JP)

(*) Notice: Subject to any disclaimer, the term of this patent is extended or adjusted under 35 U.S.C. 154(b) by 0 days.

(21) Appl. No.: 14/952,573

(22) Filed: Nov. 25, 2015

(65) Prior Publication Data

US 2016/0282587 A1 Sep. 29, 2016

(30) Foreign Application Priority Data

Sep. 30, 2014 (JP) ................... 2014-199833

(51) Int. Cl.
*G02B 13/00* (2006.01)
*G02B 9/64* (2006.01)
*G02B 27/00* (2006.01)

(52) U.S. Cl.
CPC .......... *G02B 13/0045* (2013.01); *G02B 9/64* (2013.01); *G02B 13/0055* (2013.01); *G02B 27/0025* (2013.01)

(58) Field of Classification Search
CPC ........ G02B 9/62; G02B 9/64; G02B 13/0045; G02B 13/0055; G02B 13/0075; G02B 27/0025
USPC ................. 359/708, 713, 754–758
See application file for complete search history.

(56) References Cited

U.S. PATENT DOCUMENTS

| 2,803,996 A * | 8/1957 | Bouwers | G02B 9/00 359/708 |
| 5,815,324 A * | 9/1998 | Yamamoto | G02B 15/161 359/692 |
| 6,008,884 A * | 12/1999 | Yamaguchi | G03F 7/70241 355/53 |
| 2009/0097131 A1* | 4/2009 | Iijima | G02B 15/177 359/684 |
| 2013/0002920 A1* | 1/2013 | Sano | G02B 13/0045 348/311 |
| 2015/0362701 A1* | 12/2015 | Hsu | G02B 13/00 359/757 |

(Continued)

FOREIGN PATENT DOCUMENTS

JP 2012-15523 A 1/2012

*Primary Examiner* — Jordan Schwartz
(74) *Attorney, Agent, or Firm* — Oliff PLC

(57) ABSTRACT

A compact low-profile imaging lens which offers a wide field of view and corrects aberrations properly. It includes: a first positive (refractive power) lens having a convex object-side surface as a first optical element; a second negative meniscus lens having a concave image-side surface as a second optical element; a third lens having at least one aspheric surface as a third optical element; a fourth lens having at least one aspheric surface as a fourth optical element; a fifth lens having at least one aspheric surface as a fifth optical element; and a sixth double-sided aspheric lens having a concave image-side surface as a sixth optical element. The aspheric image-side surface of the sixth lens has pole-change points off an optical axis. As a seventh optical element, one double-sided aspheric aberration correction optical element with virtually no refractive power is located between the first lens and an image plane.

18 Claims, 16 Drawing Sheets

(56) References Cited

U.S. PATENT DOCUMENTS

| | | | |
|---|---|---|---|
| 2016/0004039 A1* | 1/2016 | Chen | G02B 13/0045 359/713 |
| 2016/0004048 A1* | 1/2016 | Noda | G02B 9/62 359/713 |
| 2016/0004050 A1* | 1/2016 | Tang | G02B 13/0045 348/374 |
| 2016/0216481 A1* | 7/2016 | Chen | G02B 13/0045 |

* cited by examiner

IMAGING LENS COMPOSED OF SEVEN OPTICAL ELEMENTS

The present application is based on and claims priority of Japanese patent application No. 2014-199833 filed on Sep. 30, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens composed of seven optical elements which is built in an image pickup device mounted in an increasingly compact and low-profile smartphone, mobile phone or PDA (Personal Digital Assistant), or a game console, or an information terminal such as a PC, or a home appliance with a camera function.

In the present invention, whether or not an optical element is a lens is decided depending on whether or not it has refractive power near an optical axis. An optical element having refractive power near the optical axis is called a lens. An optical element which does not have a lens function can contribute to improvement of aberrations in the peripheral area of an image without changing the overall focal length. In terms of lens surface shape, a convex surface or a concave surface means that the paraxial portion of the surface (portion near the optical axis) is convex or concave. A "pole-change point" on an aspheric surface means a point on the aspheric surface at which a tangential plane intersects the optical axis perpendicularly.

Description of the Related Art

In recent years, there has been a general tendency that many information terminals have a camera function. Also, home appliances with a camera have been introduced into the market. For example, a user away from home can see in real time what is going on at home through the camera mounted in a home appliance by telecommunication between the home appliance and his/her smartphone and can control the home appliance on the smartphone. This kind of home appliance is called a smart home appliance and various smart home appliances such as smart cleaners, smart air conditioners, and smart refrigerators have become widely used. On the other hand, glasses or wrist watches with a camera function as products called wearable terminals have appeared in the market. A variety of unprecedented high value-added products are being developed by adding a camera function to existing products and it seems that products which further enhance consumer convenience or consumer satisfaction will be increasingly developed in the future. The cameras mounted in such products are required not only to provide high resolution to cope with an increase in the number of pixels but also to be compact and low-profile and offer high brightness and a wide field of view. For example, for use in mobile terminals, the imaging lenses are strongly expected to be low-profile and offer high resolution and high brightness. On the other hand, for use in various home appliances, the imaging lenses are strongly expected not only to meet these requirements but also to provide a capability to capture an image of an object over a wide field of view.

However, in order to provide a low-profile imaging lens with high brightness and a wide field of view as described above, the problem of difficulty in correction of aberrations in the peripheral area of an image has to be addressed and unless the problem is addressed, it is difficult to deliver high imaging performance throughout the image.

Conventionally, for example, the imaging lens described in JP-A-2012-155223 (Patent Document 1) is known as an imaging lens designed to achieve compactness and high-resolution.

Patent Document 1 discloses an imaging lens which includes, in order from an object side, a first lens group with positive refractive power, a second lens group with negative refractive power, a third lens group with positive refractive power, a fourth lens group with negative refractive power, a fifth lens group with positive refractive power, and a sixth lens group with negative refractive power. In this imaging lens, the second lens group is a negative meniscus lens having a convex surface on the object side, an aperture stop which sets a prescribed aperture is located on the object-side surface of the third lens group, the fourth lens group is a negative meniscus lens having a convex surface on an image side, and the sixth lens group has negative refractive power near the optical axis, in which it gradually changes to positive refractive power and the positive refractive power is stronger in a portion nearer to the periphery. Consequently the imaging lens offers a relatively wide field of view, high brightness, and high resolution.

The imaging lens described in Patent Document 1 includes six single lenses or six lenses including one cemented lens, with an F-value of 2.32 to 2.43 for the configuration with six single lenses or with an F-value of 2.09 to 2.35 for the configuration with six lenses including one cemented lens, so that it corrects various aberrations properly and relatively high brightness. In addition, it provides a relatively wide field of view of 66 to 70 degrees. However, the total track length is longer than the diagonal length of the effective imaging plane of the image sensor, so that it is difficult to use the imaging lens in a mobile terminal which is expected to be low-profile. If this lens system is supposed to offer a wider field of view and higher brightness, it would be difficult to correct aberrations in the peripheral area properly and ensure high image quality throughout the image. In addition, if a cemented lens is used, a sophisticated manufacturing technique is required and thus it is difficult to mass-produce the imaging lens to meet the demand for cost reduction.

As mentioned above, in the conventional art, it is difficult to provide a low-profile low-cost imaging lens which offers high brightness, high resolution and a wide field of view.

SUMMARY OF THE INVENTION

The present invention has been made in view of the above problem, and an object thereof is to provide a compact low-cost imaging lens which meets the demand for low-profileness, offers a wide field of view and high brightness and corrects various aberrations properly.

Here, "low-profile" implies that total track length is smaller than the diagonal length of the effective imaging plane of the image sensor and "wide field of view" implies that the field of view is 70 degrees or more. Here, the diagonal length of the effective imaging plane of the image sensor is equal to the diameter of an effective image circle whose radius is the maximum image height, that is, the vertical height from an optical axis to the point where a light ray incident on the imaging lens at a maximum field of view enters the imaging plane.

According to an aspect of the present invention, there is provided an imaging lens composed of seven optical elements which forms an image of an object on a solid-state image sensor, in which the elements are arranged in order from an object side to an image side as follows: a first lens with positive refractive power having a convex surface on the object side as a first optical element; a second lens with negative refractive power as a meniscus lens having a concave surface on the image side as a second optical element; a third lens with positive or negative refractive power having at least one aspheric surface as a third optical element; a fourth lens with positive or negative refractive power having at least one aspheric surface as a fourth optical element; a fifth lens with positive or negative refractive power having at least one aspheric surface as a fifth optical element; and a sixth lens with positive or negative refractive power as a double-sided aspheric lens having a concave surface on the image side as a sixth optical element. The image-side surface of the sixth lens has an aspheric shape with pole-change points off an optical axis. As a seventh optical element, one double-sided aspheric aberration correction optical element with virtually no refractive power is located between the first lens and an image plane.

In the imaging lens composed of seven optical elements with the above configuration, the first lens has strong refractive power to achieve low-profileness and the second lens corrects spherical aberrations and chromatic aberrations properly. The third, fourth, and fifth lenses each have at least one aspheric surface and are given appropriate positive or negative refractive power to ensure low-profileness and correct off-axial aberrations such as astigmatism, field curvature, and distortion. The sixth lens, a lens with positive or negative refractive power having a concave surface on the image side, corrects field curvature and distortion in the peripheral area and spherical aberrations using the aspheric surfaces on the both sides. Furthermore, the image-side surface of the sixth lens has an aspheric shape with pole-change points to optimize the angle of rays incident on the image sensor. In addition to the above six constituent lenses with refractive power, one optical element with virtually no refractive power for aberration correction as a seventh optical element (hereinafter called the aberration correction optical element) is located between the first lens and the image plane so that aberrations in the peripheral area of the image are corrected more properly.

Since the aberration correction optical element in the above configuration has a parallel plate shape near the optical axis, it influences neither the refractive power of the overall optical system of the imaging lens, nor the refractive power of any of the constituent lenses. Therefore, it is effective in improving aberrations only in the peripheral area without changing the focal length of the optical system.

The aberration correction optical element is located between the first lens and the second lens, between the second lens and the third lens, between the third lens and the fourth lens, between the fourth lens and the fifth lens, between the fifth lens and the sixth lens, or between the sixth lens and the image plane so that its aspheric surfaces on the both sides can work to properly correct aberrations which occur on an optical element located nearer to the object than the aberration correction optical element. Thus, it effectively functions to improve aberrations of rays over a wide field of view and improve aberrations in the peripheral area which increase as the F-value is lower.

Preferably, the imaging lens composed of seven optical elements with the above configuration satisfies conditional expressions (1) to (3) below:

$$0.05<TN/f<0.35 \quad (1)$$

$$0.03<dN/f<0.25 \quad (2)$$

$$45<vdN<65 \quad (3)$$

where
f: focal length of the overall optical system of the imaging lens,
TN: distance on the optical axis between lenses where the aberration correction optical element is located,
dN: thickness of the aberration correction optical element on the optical axis, and
vdN: Abbe number of the aberration correction optical element at d-ray.

The conditional expression (1) defines an appropriate range for the size (distance) of the space where the aberration correction optical element is located, and indicates a condition to achieve low-profileness and correct aberrations. If the value is above the upper limit of the conditional expression (1), the distance between lenses where the aberration correction optical element is located would be too large to achieve low-profileness. On the other hand, if the value is below the lower limit of the conditional expression (1), the space for the aberration correction optical element would be too small, which might impose a restriction on the peripheral shape of the aberration correction optical element and make it impossible to fulfill its aberration correction function. When the aberration correction optical element is located between the sixth lens and the image plane, the "distance on the optical axis between lenses where the aberration correction optical element is located" in the conditional expression (1) refers to the distance on the optical axis from the image-side surface of the sixth lens to the image plane, in which the filter is converted into an equivalent air distance.

The conditional expression (2) defines an appropriate range for the ratio of the thickness of the aberration correction optical element on the optical axis to the focal length of the overall optical system. When the conditional expression (2) is satisfied, the aberration correction optical element has an appropriate thickness to ensure low-profileness and formability and fulfill its function to correct off-axial aberrations.

The conditional expression (3) defines an appropriate range for the Abbe number of the material of the aberration correction optical element. When a material which satisfies the conditional expression (3), that is, a low-dispersion material, is adopted, aberrations in the peripheral area are corrected easily. Also, the range of Abbe numbers defined by the conditional expression (3) suggests that the aberration correction optical element can be made of inexpensive plastic material so that the imaging lens can be manufactured at low cost.

Preferably, the imaging lens composed of seven optical elements with the above configuration satisfies a conditional expression (4) below:

$$f/EPD<2.40 \quad (4)$$

where
f: focal length of the overall optical system of the imaging lens, and
EPD: entrance pupil diameter.

The conditional expression (4) indicates a condition to determine the brightness of the imaging lens and corresponds to an F-value. When the pixel size of the image sensor is smaller, the quantity of light which the image sensor takes from the imaging lens tends to be smaller and thus it is more difficult to form a bright image. If the sensitivity of the image sensor is increased to solve this problem, image quality may deteriorate due to noise, etc. Therefore, as a solution to the problem, it is effective to increase the quantity of light exiting the imaging lens. When the conditional expression (4) is satisfied, the imaging lens can be applied to the latest image sensor with a high pixel density.

Preferably, in the imaging lens composed of seven optical elements with the above configuration, the composite refractive power of the first, second and third lenses is positive, the composite refractive power of the fourth and fifth lenses is positive, and the refractive power of the sixth lens is negative. This refractive power arrangement increases the telephoto capability and contributes to low-profileness and improvement in optical performance.

Preferably, the imaging lens composed of seven optical elements with the above configuration satisfies a conditional expression (5) below:

$$0.5 < f123/f < 2.0 \qquad (5)$$

where f123: composite focal length of the first lens, the second lens, and the third lens, and f: focal length of the overall optical system of the imaging lens.

The conditional expression (5) defines an appropriate range for the ratio of the positive composite focal length of the first, second, and third lenses to the focal length of the overall optical system, and indicates a condition to achieve low-profileness and correct chromatic aberrations properly. If the value is above the upper limit of the conditional expression (5), the negative refractive power of the second lens would be relatively strong and thus it would be easier for the second lens to correct chromatic aberrations, but due to the weakened positive composite refractive power, it would be difficult to achieve low-profileness. On the other hand, if the value is below the lower limit of the conditional expression (5), the positive composite refractive power would be too strong and it would be easier to achieve low-profileness, but the negative refractive power of the second lens would be relatively weak and it would be difficult to correct chromatic aberrations.

Preferably, in the imaging lens composed of seven optical elements with the above configuration, the fourth lens has positive refractive power, the fifth lens has negative refractive power, and a conditional expression (6) below is satisfied:

$$2.0 < |f5|/f4 < 10.0 \qquad (6)$$

where f4: focal length of the fourth lens, and f5: focal length of the fifth lens.

The conditional expression (6) defines an appropriate range for the ratio of the focal length of the fifth lens to the focal length of the fourth lens when the fourth lens has positive refractive power and the fifth lens has negative refractive power, and indicates a condition to correct chromatic aberrations and ensure low-profileness. If the value is above the upper limit of the conditional expression (6), the negative refractive power of the fifth lens would be relatively weak and it would be difficult to correct chromatic aberrations which occur on the fourth lens. On the other hand, if the value is below the lower limit of the conditional expression (6), the negative refractive power of the fifth lens would be relatively strong and makes it difficult to ensure low-profileness. When the fourth lens has positive refractive power, axial chromatic aberrations are corrected properly.

Preferably, in the imaging lens composed of seven optical elements with the above configuration, the fourth lens has negative refractive power, the fifth lens has positive refractive power, and a conditional expression (7) below is satisfied:

$$0.5 < |f4|/f5 < 5.0 \qquad (7)$$

where f4: focal length of the fourth lens, and f5: focal length of the fifth lens.

The conditional expression (7) defines an appropriate range for the ratio of the focal length of the fourth lens to the focal length of the fifth lens when the fourth lens has negative refractive power and the fifth lens has positive refractive power, and indicates a condition to correct chromatic aberrations and ensure low-profileness. If the value is above the upper limit of the conditional expression (7), the negative refractive power of the fourth lens would be relatively weak and it would be difficult to correct chromatic aberrations which occur on the fifth lens. On the other hand, if the value is below the lower limit of the conditional expression (7), the negative refractive power of the fourth lens would be relatively strong and makes it difficult to ensure low-profileness. When the fourth lens has negative refractive power, chromatic aberrations of magnification in the middle image height area are corrected properly.

Preferably, the imaging lens composed of seven optical elements with the above configuration satisfies a conditional expression (8) below:

$$-1.2 < f6/f < -0.5 \qquad (8)$$

where f: focal length of the overall optical system of the imaging lens, and f6: focal length of the sixth lens.

The conditional expression (8) defines an appropriate range for the ratio of the focal length of the sixth lens to the focal length of the overall optical system, and indicates a condition to ensure low-profileness and correct spherical aberrations and distortion properly. If the value is above the upper limit of the conditional expression (8), the negative refractive power of the sixth lens would be relatively strong and it would be difficult to ensure low-profileness. On the other hand, if the value is below the lower limit of the conditional expression (8), the negative refractive power of the sixth lens would be relatively weak and it would be difficult to correct spherical aberrations and distortion.

Preferably, the imaging lens composed of seven optical elements with the above configuration satisfies conditional expressions (9) to (12) below:

$$25 < vd1 - vd2 < 40 \qquad (9)$$

$$45 < vd3 < 65 \qquad (10)$$

$$20 < |vd4 - vd5| < 40 \qquad (11)$$

$$45 < vd6 < 65 \qquad (12)$$

where vd1: Abbe number of the first lens at d-ray, vd2: Abbe number of the second lens at d-ray, vd3: Abbe number of the third lens at d-ray, vd4: Abbe number of the fourth lens at d-ray, vd5: Abbe number of the fifth lens at d-ray, and
vd6: Abbe number of the sixth lens at d-ray.

The conditional expressions (9) to (12) define appropriate ranges for the Abbe numbers of the first to sixth lenses at d-ray, and indicate conditions to correct chromatic aberrations properly. The conditional expression (9) suggests that when low-dispersion material is used for the first lens and high-dispersion material is used for the second lens, chromatic aberrations which occur on the first lens are corrected properly. The conditional expression (11) suggests that low-dispersion material and high-dispersion material should be used for the fourth lens and the fifth lens appropriately. Specifically, when the fourth lens has positive refractive power and the fifth lens has negative refractive power, low-dispersion material should be used for the fourth lens and high-dispersion material should be used for the fifth lens, and when the fourth lens has negative refractive power and the fifth lens has positive refractive power, high-dispersion material should be used for the fourth lens and low-dispersion material should be used for the fifth lens. In either case, when the conditional expression (11) is satisfied, chromatic aberrations are corrected properly. The conditional expressions (10) and (12) suggest that the use of low-dispersion material for the third and sixth lenses suppresses chromatic aberrations of magnification. The ranges defined by the conditional expressions (9) to (12) suggest that an inexpensive plastic material may be selected to reduce the cost of the imaging lens.

Preferably, the imaging lens composed of seven optical elements with the above configuration satisfies conditional expressions (13) and (14) below:

$$0.5 < f1/f < 1.5 \tag{13}$$

$$-1.6 < (r1+r2)/(r1-r2) < -0.5 \tag{14}$$

where
f: focal length of the overall optical system of the imaging lens,
f1: focal length of the first lens,
r1: curvature radius of the object-side surface of the first lens, and
r2: curvature radius of the image-side surface of the first lens.

The conditional expression (13) defines an appropriate range for the ratio of the focal length of the first lens to the focal length of the overall optical system, and indicates a condition to ensure low-profileness and correct chromatic aberrations properly. If the value is above the upper limit of the conditional expression (13), the refractive power of the first lens would be relatively weak and it would be difficult to ensure low-profileness. On the other hand, if the value is below the lower limit of the conditional expression (13), the refractive power of the first lens would be relatively strong and it would be difficult for the second lens to correct chromatic aberrations.

The conditional expression (14) indicates a condition to optimize the relation in shape between the object-side and image-side surfaces of the first lens to ensure low-profileness, correct chromatic aberrations properly, and suppress an increase in the manufacturing error sensitivity of the first lens. If the value is above the upper limit of the conditional expression (14), the object-side and image-side surfaces of the first lens would be symmetrical to each other in shape and chromatic aberrations would worsen. Furthermore, the image-side principal point of the first lens would shift toward the image side, making it difficult to ensure low-profileness. On the other hand, if the value is below the lower limit of the conditional expression (14), the image-side principal point of the first lens would shift toward the object side and it would be easy to ensure low-profileness but the curvature radius of the object-side or image-side surface of the first lens would be too small and undesirably the manufacturing error sensitivity would increase.

Preferably, the imaging lens composed of seven optical elements with the above configuration satisfies a conditional expression (15) below:

$$2.0 < (r3+r4)/(r3-r4) < 10.0 \tag{15}$$

where
r3: curvature radius of the object-side surface of the second lens, and
r4: curvature radius of the image-side surface of the second lens.

The conditional expression (15) indicates a condition to optimize the relation in shape between the object-side and image-side surfaces of the second lens to correct various aberrations properly. When the conditional expression (15) is satisfied, it is easy to correct coma aberrations, field curvature, astigmatism, and chromatic aberrations.

Preferably, the imaging lens composed of seven optical elements with the above configuration satisfies a conditional expression (16) below:

$$-0.8 < (r11+r12)/(r11-r12) < 1.50 \tag{16}$$

where
r11: curvature radius of the object-side surface of the sixth lens, and
r12: curvature radius of the image-side surface of the sixth lens.

The conditional expression (16) indicates a condition to optimize the relation in shape between the object-side and image-side surfaces of the sixth lens to control the angle of rays incident on the image sensor and correct distortion properly. If the value is above the upper limit of the conditional expression (16) and the sixth lens has a meniscus shape, the negative refractive power of the image-side surface of the sixth lens would be strong and considerable dispersion of light rays would occur, thereby making it difficult to ensure telecentricity. On the other hand, if the value is below the lower limit of the conditional expression (16) and the sixth lens has a biconcave shape, the negative refractive power of the object-side surface of the sixth lens would be too strong to correct distortion in the peripheral area.

Preferably, the imaging lens composed of seven optical elements with the above configuration satisfies conditional expressions (17) and (18) below:

$$0.02 < f123/f45 < 1.5 \tag{17}$$

$$-22.0 < f45/f6 < -1.0 \tag{18}$$

where
f123: composite focal length of the first lens, the second lens, and the third lens,
f45: composite focal length of the fourth lens and the fifth lens, and
f6: focal length of the sixth lens.

The conditional expression (17) defines an appropriate range for the ratio of the composite focal length of the first, second, and third lenses to the composite focal length of the fourth and fifth lenses, and indicates a condition to ensure low-profileness and correct various aberrations properly. If the value is above the upper limit of the conditional expression (17), the composite refractive power of the first, second, and third lenses would be relatively weak and it would be difficult to ensure low-profileness. On the other hand, if the value is below the lower limit of the conditional expression (17), the composite refractive power of the fourth and fifth lenses would be too weak to properly correct aberrations which occur on the first, second, and third lenses.

The conditional expression (18) defines an appropriate range for the ratio of the composite focal length of the fourth and fifth lenses to the focal length of the sixth lens, and indicates a condition to ensure low-profileness and correct axial and off-axial chromatic aberrations and distortion properly. If the value is above the upper limit of the conditional expression (18), the composite refractive power of the fourth and fifth lenses would be relatively strong and it would be easy to shorten the total track length, but it would be difficult to correct off-axial chromatic aberrations. Furthermore, distortion in the high image height area would increase toward the minus side, leading to the increasing tendency toward a barrel distortion. On the other hand, if the value is below the lower limit of the conditional expression (18), the composite refractive power of the fourth and fifth lenses would be relatively weak and it would be difficult to correct axial chromatic aberrations. When the conditional expressions (17) and (18) are satisfied, low-profileness is ensured and the optical performance is improved.

DETAILED DESCRIPTION OF THE PREFERRED EMBODIMENTS

Hereinafter, the preferred embodiment of the present invention will be described in detail referring to the accompanying drawings. FIGS. 1, 3, 5, 7, 9, 11, 13, and 15 are schematic views showing the general configurations of the imaging lenses composed of seven optical elements in Numerical Examples 1 to 8 according to this embodiment, respectively. Since all these numerical examples have the same basic lens configuration, the general configuration of an imaging lens according to this embodiment is explained below mainly referring to the schematic view of Numerical Example 1.

Figure 1:
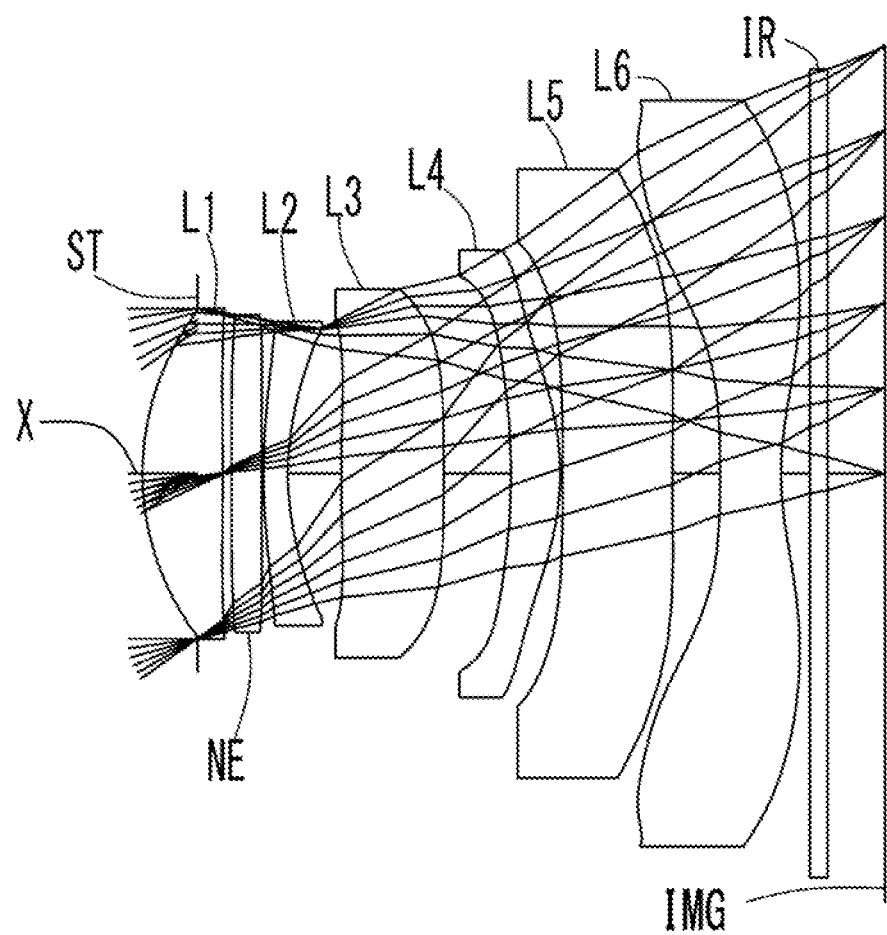
FIG. 1 is a schematic view showing the general configuration of an imaging lens in Numerical Example 1 according to an embodiment of the present invention.

As shown in FIG. 1, the imaging lens according to this embodiment is an imaging lens composed of seven optical elements which forms an image of an object on a solid-state image sensor and includes, in order from an object side to an image side, a first lens L1 with positive refractive power having a convex surface on the object side as a first optical element, a second lens L2 with negative refractive power as a meniscus lens having a concave surface on the image side as a second optical element, a third lens L3 with positive or negative refractive power having at least one aspheric surface as a third optical element, a fourth lens L4 with positive or negative refractive power having at least one aspheric surface as a fourth optical element, a fifth lens L5 with positive or negative refractive power having at least one aspheric surface as a fifth optical element, and a sixth lens L6 with positive or negative refractive power having a concave surface on the image side as a sixth optical element. The image-side surface of the sixth lens L6 has an aspheric shape with pole-change points off an optical axis X. As a seventh optical element, a double-sided aspheric aberration correction optical element NE with virtually no refractive power is located between the first lens L1 and the second lens L2. Thus, the imaging lens according to this embodiment includes a total of seven elements: six optical elements with refractive power and one aberration correction optical element NE with virtually no refractive power.

A filter IR such as an infrared cut filter is located between the sixth lens L6 and the image plane IMG. The filter IR is omissible. The value of total track length or back focus of the imaging lens according to this embodiment is defined as a distance in which the filter IR is converted into an equivalent air distance.

An aperture stop ST is located on the object side of the first lens L1.

In this embodiment, the first lens L1 is a biconvex lens having a convex surface on each of the object and image sides, which has strong positive refractive power to achieve low-profileness. The shape of the first lens L1 is not limited to a biconvex shape. It may have a meniscus shape with a convex surface on the object side as in Numerical Examples 6, 7, and 8 shown in FIGS. 11, 13, and 15, respectively.

The second lens L2 has a meniscus shape with a concave surface on the image side, so that it properly corrects spherical aberrations and chromatic aberrations which occur on the first lens L1.

The third lens L3 is a biconvex double-sided aspheric lens with positive refractive power having a convex surface on each of the object and images sides. The shape of the third lens L3 is not limited to a biconvex shape. Instead, it may be a meniscus shape with a convex surface on the object side as in Numerical Example 4 shown in FIG. 7 or a meniscus shape with a concave surface on the object side as in Numerical Example 5 shown in FIG. 9. The refractive power of the third lens L3 is not limited to positive refractive power. In Numerical Example 4 shown in FIG. 7, the third lens L3 has negative refractive power.

The fourth lens L4 is a meniscus double-sided aspheric lens with positive refractive power having a concave surface on the object side. The refractive power of the fourth lens L4 is not limited to positive refractive power. In Numerical Examples 6 and 7 shown in FIGS. 11 and 13 respectively, the fourth lens L4 is a meniscus lens with negative refractive power having a concave surface on the object side and in Numerical Example 8 shown in FIG. 15, the fourth lens L4 is a biconcave lens with negative refractive power having a concave surface on each of the object and image sides.

The fifth lens L5 is a biconcave double-sided aspheric lens with negative refractive power having a concave surface on each of the object and image sides. The refractive power of the fifth lens L5 is not limited to negative refractive power. In Numerical Example 6 shown in FIG. 11, the fifth lens L5 is a biconvex lens with positive refractive power having a convex surface on each of the object and image sides, in Numerical Example 7 shown in FIG. 13, it is a meniscus lens with positive refractive power having a convex surface on the object side, and in Numerical Example 8 shown in FIG. 15, it is a meniscus lens with positive refractive power having a concave surface on the object side.

As for the refractive power of the fourth lens L4 and fifth lens L5, when the fourth lens L4 has positive refractive power, the fifth lens L5 has negative refractive power, and when the fourth lens has negative refractive power, the fifth lens L5 has positive refractive power. In either case, the composite refractive power of the fourth lens L4 and fifth lens L5 is designed to be positive. In Numerical Examples 1, 2, 3, 4, and 5 shown in FIGS. 1, 3, 5, 7, and 9 respectively, the fourth lens L4 has positive refractive power and the fifth lens L5 has negative refractive power and in Numerical Examples 6, 7, and 8 shown in FIGS. 11, 13, and 15 respectively, the fourth lens L4 has negative refractive power and the fifth lens L5 has positive refractive power.

The third lens L3 to fifth lens L5 are given appropriate positive or negative refractive power and their surfaces have aspheric shapes to ensure low-profileness and correct various off-axial aberrations such as astigmatism, field curvature and distortion properly.

The sixth lens L6 is a biconcave double-sided aspheric lens with negative refractive power having a concave surface on each of the object and image sides. The both aspheric surfaces correct field curvature and distortion in the peripheral area and spherical aberrations. Since the image-side surface of the sixth lens L6 has an aspheric shape with pole-change points, it optimizes the angle of rays incident on the image plane IMG. The shape of the sixth lens L6 is not limited to a biconcave shape. In Numerical Examples 3 and 4 shown in FIGS. 5 and 7 respectively, the sixth lens L6 has a meniscus shape with a convex surface on the object side.

In the imaging lens composed of seven optical elements according to this embodiment, when the first lens L1, the second lens L2, and the third lens L3 are considered as constituting one group, their composite refractive power is positive, when the fourth lens L4 and fifth lens L5 are considered as constituting one group, their composite refractive power is positive, and the sixth lens L6, located nearest to the image side, has negative refractive power. Thus, these lenses make a so-called telephoto type power arrangement in which positive, positive, and negative refractive power lenses are arranged in order from the object side, which is advantageous in making the imaging lens low-profile. Each constituent lens is given optimum refractive power and an appropriate aspheric surface is formed on each lens surface to deliver high performance.

In addition to the above six constituent lenses, the imaging lens composed of seven optical elements according to this embodiment has an aberration correction optical element NE with virtually no refractive power as a seventh optical element, between the first lens L1 and the second lens L2. Consequently aberrations in the peripheral area of the image are corrected more properly.

Since the aberration correction optical element NE has a parallel plate shape near the optical axis, it influences neither the refractive power of the overall optical system of the imaging lens, nor the refractive power of any constituent lens. Therefore, it corrects aberrations only in the peripheral area without changing the focal length of the optical system.

Figure 3:
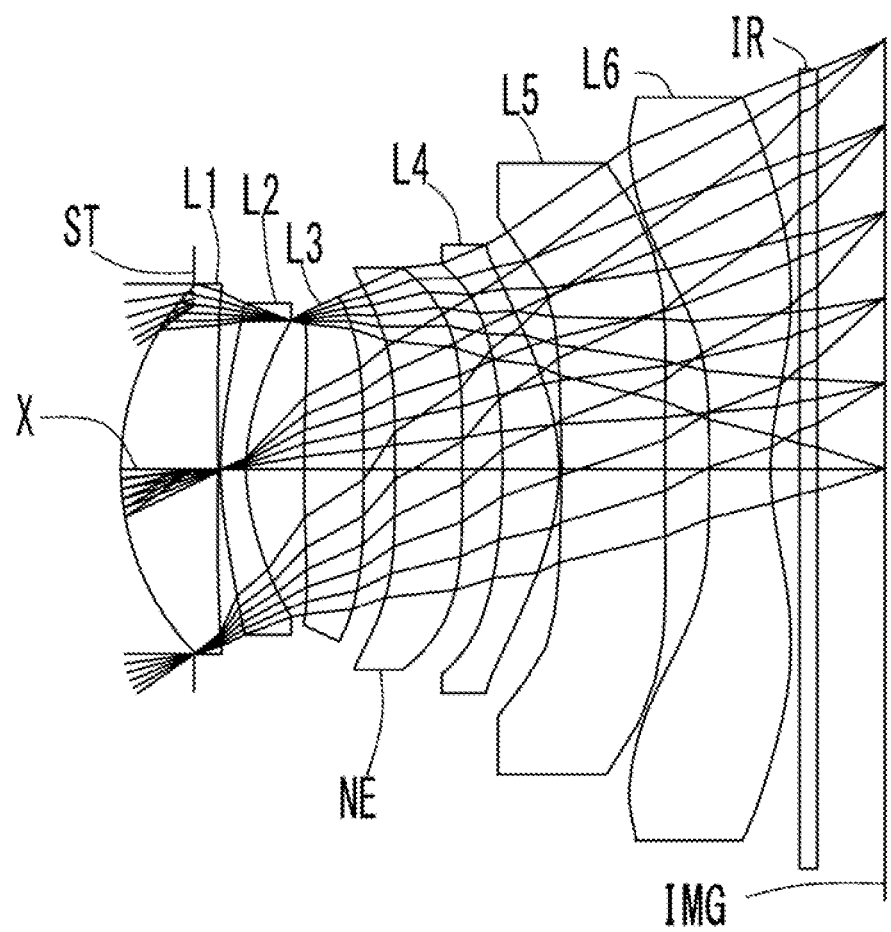
FIG. 3 is a schematic view showing the general configuration of an imaging lens in Numerical Example 2 according to the embodiment of the present invention.
Figure 5:
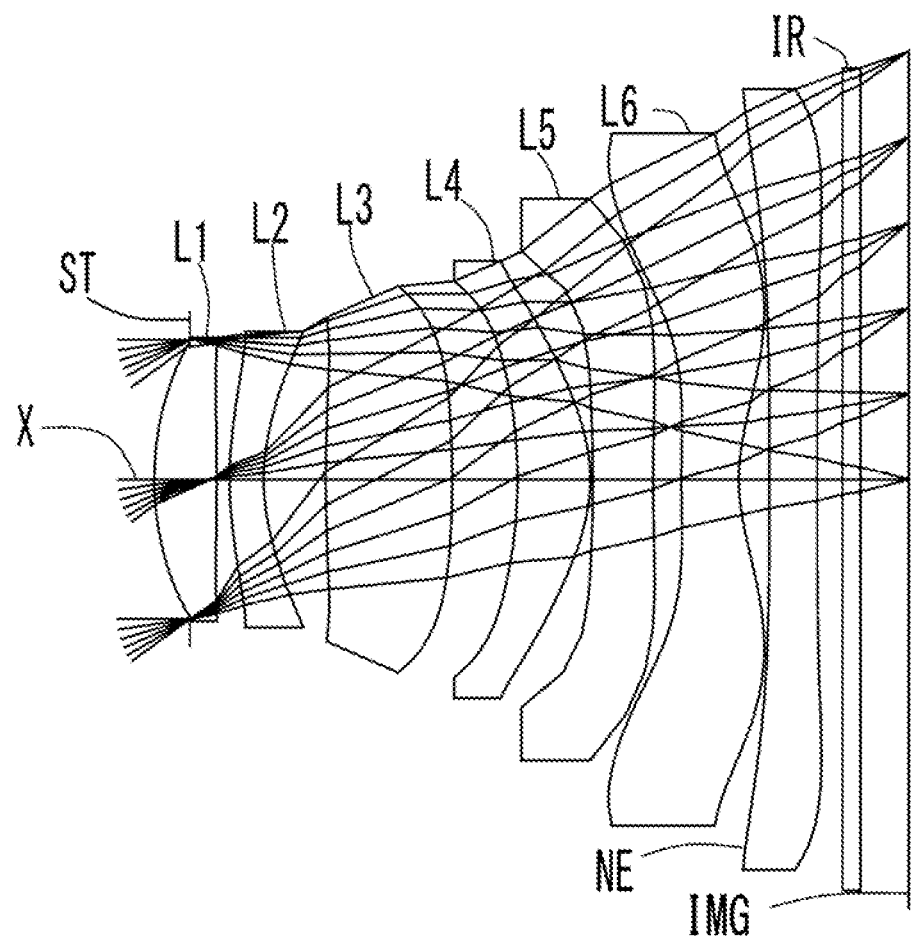
FIG. 5 is a schematic view showing the general configuration of an imaging lens in Numerical Example 3 according to the embodiment of the present invention.
Figure 7:
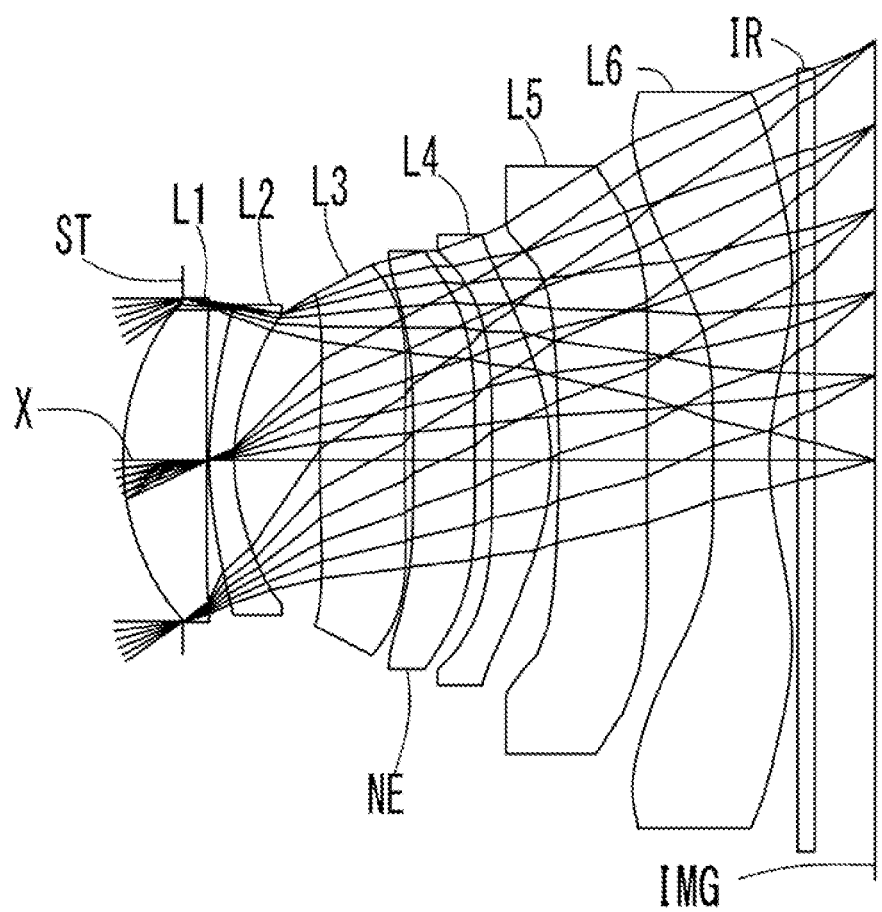
FIG. 7 is a schematic view showing the general configuration of an imaging lens in Numerical Example 4 according to the embodiment of the present invention.
Figure 9:
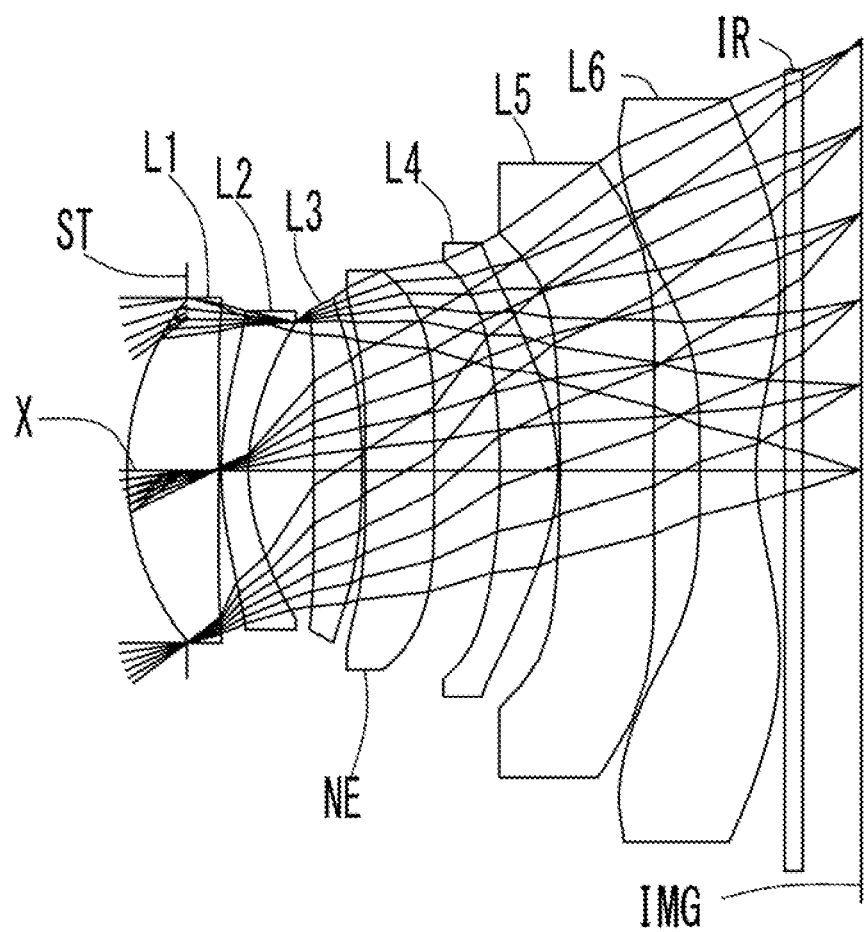
FIG. 9 is a schematic view showing the general configuration of an imaging lens in Numerical Example 5 according to the embodiment of the present invention.
Figure 11:
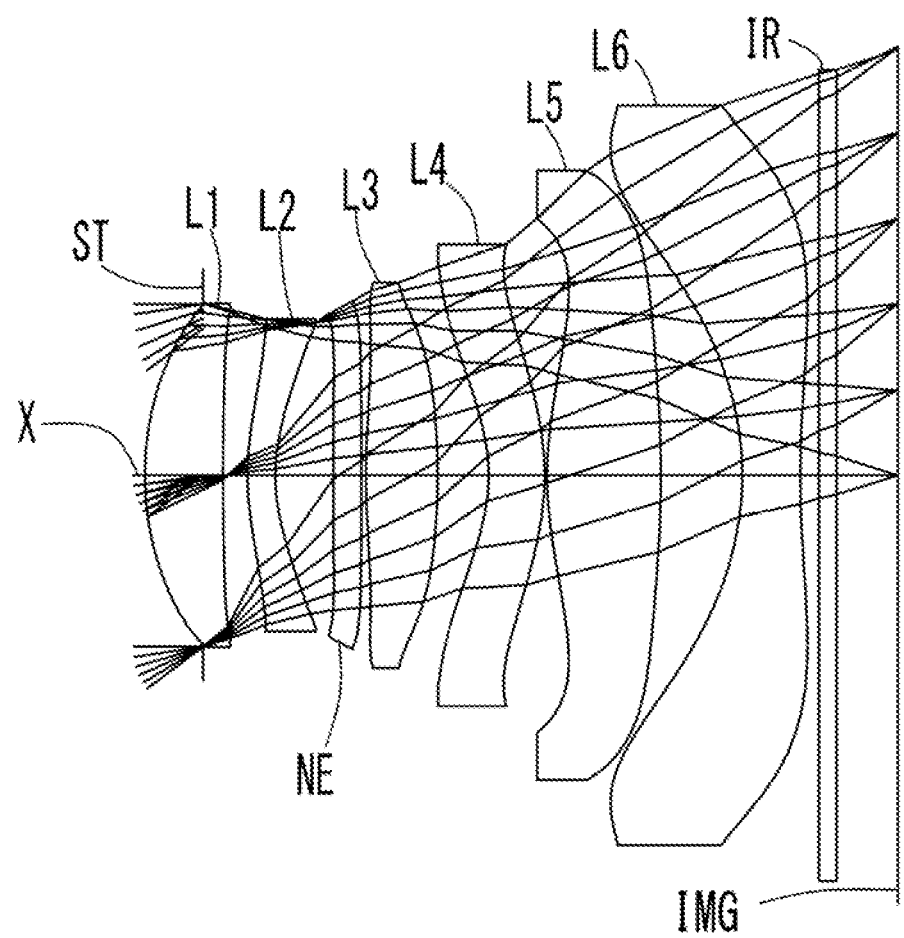
FIG. 11 is a schematic view showing the general configuration of an imaging lens in Numerical Example 6 according to the embodiment of the present invention.
Figure 13:
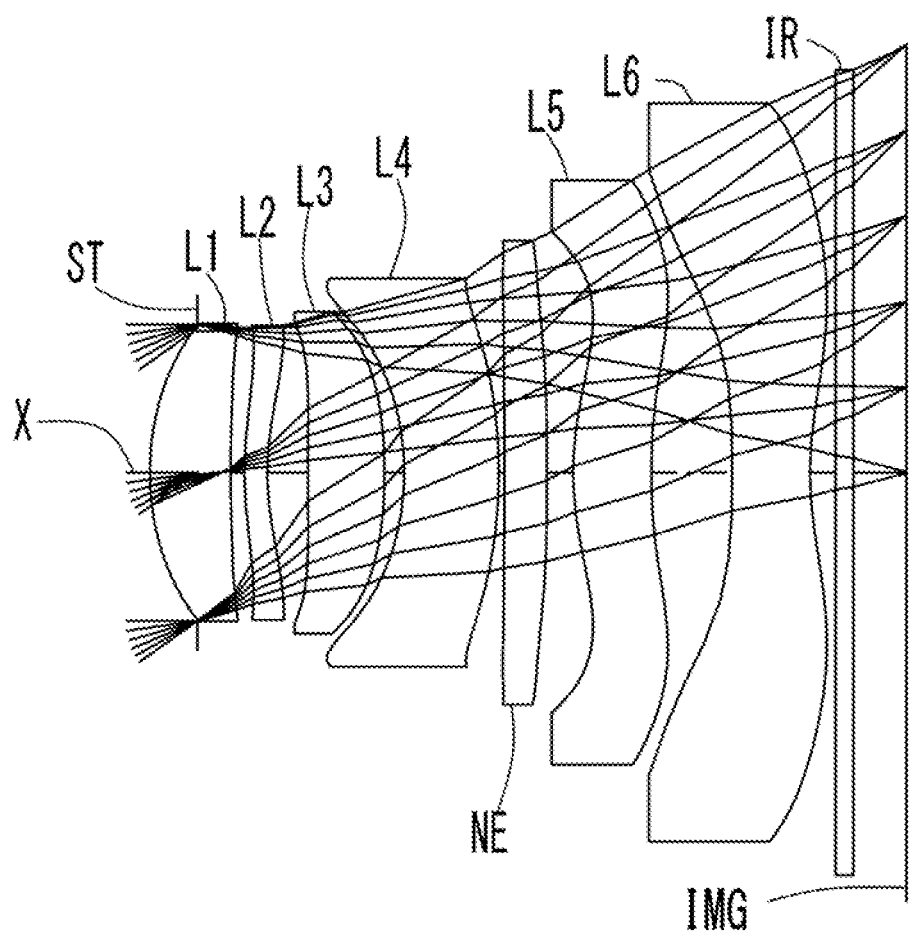
FIG. 13 is a schematic view showing the general configuration of an imaging lens in Numerical Example 7 according to the embodiment of the present invention.
Figure 15:
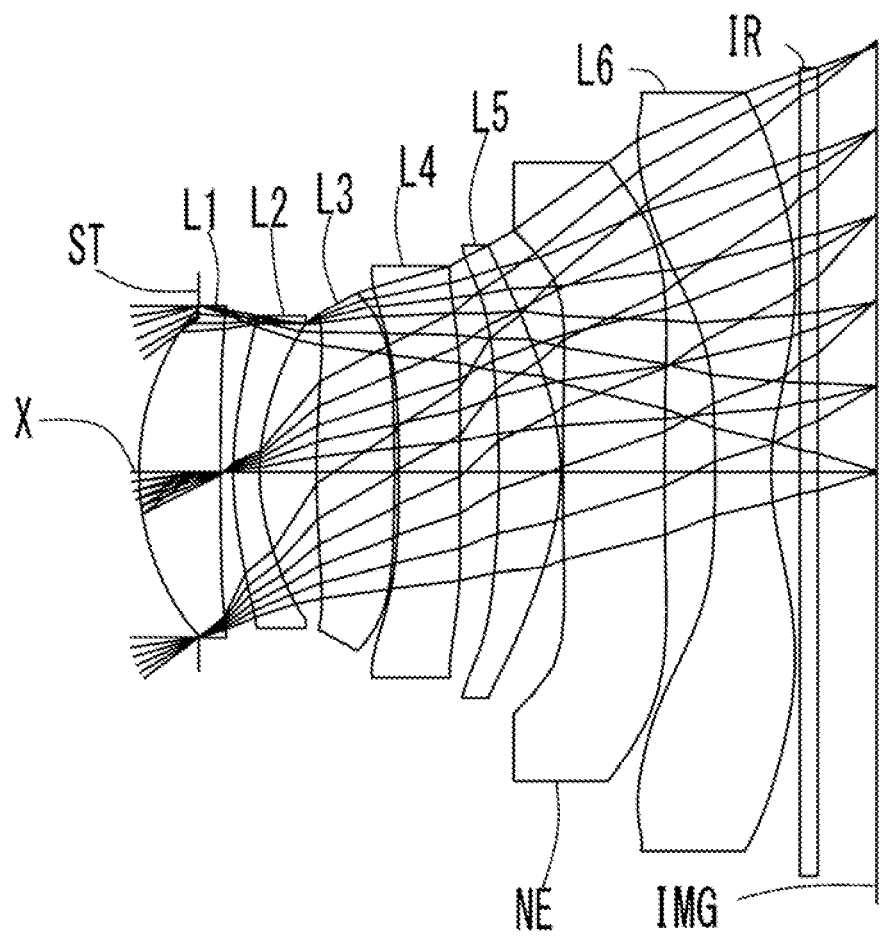
FIG. 15 is a schematic view showing the general configuration of an imaging lens in Numerical Example 8 according to the embodiment of the present invention.

In Numerical Example 1 shown in FIG. 1, the aberration correction optical element NE is located between the first lens L1 and the second lens L2; in Numerical Examples 2, 4, and 5 shown in FIGS. 3, 7, and 9 respectively, it is located between the third lens L3 and the fourth lens L4; in Numerical Example 3 shown in FIG. 5, it is located between the sixth lens L6 and the image plane IMG; in Numerical Example 6 shown in FIG. 11, it is located between the second lens L2 and the third lens L3; in Numerical Example 7 shown in FIG. 13, it is located between the fourth lens L4 and the fifth lens L5; and in Numerical Example 8 shown in FIG. 15, it is located between the fifth lens L5 and the sixth lens L6. The both aspheric surfaces of the aberration correction optical element NE located between neighboring elements in this way effectively work to properly correct aberrations in the peripheral area, particularly aberrations which occur on a lens located nearer to the object than the aberration correction optical element NE. Therefore, it is effective in improving aberrations of rays over a wide field of view and improving aberrations in the peripheral area which increase as the F-value is lower.

In the imaging lens composed of seven optical elements according to this embodiment, the aperture stop ST is located on the object side of the first lens L1. Thus, the exit pupil is remote from the image plane IMG, which ensures telecentricity and prevents a decline in the quantity of light in the peripheral area of the image.

When the imaging lens composed of seven optical elements according to this embodiment satisfies conditional expressions (1) to (18) below, it brings about advantageous effects:

$$0.05 < TN/f < 0.35 \tag{1}$$

$$0.03 < dN/f < 0.25 \tag{2}$$

$$45 < vdN < 65 \tag{3}$$

$f/EPD<2.40$ (4)

$0.5<f123/f<2.0$ (5)

$2.0<|f5|/f4<10.0$ (6)

$0.5<|f4|/f5<5.0$ (7)

$-1.2<f6/f<-0.5$ (8)

$25<vd1-vd2<40$ (9)

$45<vd3<65$ (10)

$20<|vd4-vd5|<40$ (11)

$45<vd6<65$ (12)

$0.5<f1/f<1.5$ (13)

$-1.6<(r1+r2)/(r1-r2)<-0.5$ (14)

$2.0<(r3+r4)/(r3-r4)<10.0$ (15)

$-0.8<(r11+r12)/(r11-r12)<1.50$ (16)

$0.02<f123/f45<1.5$ (17)

$-22.0<f45/f6<-1.0$ (18)

where f: focal length of the overall optical system of the imaging lens,
TN: distance on the optical axis X between lenses where the aberration correction optical element NE is located,
dN: thickness of the aberration correction optical element NE on the optical axis X,
vdN: Abbe number of the aberration correction optical element NE at d-ray,
EPD: entrance pupil diameter,
f1: focal length of the first lens L1,
f4: focal length of the fourth lens L4,
f5: focal length of the fifth lens L5,
f6: focal length of the sixth lens L6,
f123: composite focal length of the first lens L1, the second lens L2, and the third lens L3,
f45: composite focal length of the fourth lens L4 and the fifth lens L5,
vd1: Abbe number of the first lens L1 at d-ray,
vd2: Abbe number of the second lens L2 at d-ray,
vd3: Abbe number of the third lens L3 at d-ray,
vd4: Abbe number of the fourth lens L4 at d-ray,
vd5: Abbe number of the fifth lens L5 at d-ray,
vd6: Abbe number of the sixth lens L6 at d-ray,
r1: curvature radius of the object-side surface of the first lens L1,
r2: curvature radius of the image-side surface of the first lens L1,
r3: curvature radius of the object-side surface of the second lens L2,
r4: curvature radius of the image-side surface of the second lens L2,
r11: curvature radius of the object-side surface of the sixth lens L6, and
r12: curvature radius of the image-side surface of the sixth lens L6.

When the imaging lens composed of seven optical elements according to this embodiment satisfies conditional expressions (1a) to (18a) below, it brings about more advantageous effects:

$0.06<TN/f<0.32$ (1a)

$0.03<dN/f<0.23$ (2a)

$50<vdN<60$ (3a)

$f/EPD<2.20$ (4a)

$0.55<f123/f<1.8$ (5a)

$2.2<|f5|/f4<9.0$ (6a)

$0.55<|f4|/f5<4.5$ (7a)

$-1.08<f6/f<-0.55$ (8a)

$28<vd1-vd2<36$ (9a)

$50<vd3<60$ (10a)

$28<|vd4-vd5|<36$ (11a)

$50<vd6<60$ (12a)

$0.55<f1/f<1.35$ (13a)

$-1.44<(r1+r2)/(r1-r2)<-0.55$ (14a)

$2.2<(r3+r4)/(r3-r4)<9.0$ (15a)

$-0.72<(r11+r12)/(r11-r12)<1.35$ (16a)

$0.02<f123/f45<1.35$ (17a)

$-20.0<f45/f6<-1.0$ (18a)

The signs in the above conditional expressions have the same meanings as those in the preceding paragraph.

When the imaging lens composed of seven optical elements according to this embodiment satisfies conditional expressions (1b) to (18b) below, it brings about particularly advantageous effects:

$0.07 \le TN/f \le 0.28$ (1b)

$0.05 \le dN/f \le 0.18$ (2b)

$52<vdN<58$ (3b)

$f/EPD \le 2.10$ (4b)

$0.75 \le f123/f \le 1.36$ (5b)

$3.21 \le |f5|/f4 \le 8.22$ (6b)

$0.95 \le |f4|/f5 \le 3.15$ (7b)

$-0.89 \le f6/f \le -0.71$ (8b)

$28<vd1-vd2<34$ (9b)

$52<vd3<58$ (10b)

$28<|vd4-vd5|<34$ (11b)

$52<vd6<58$ (12b)

$0.7 \le f1/f \le 1.08$ (13b)

$-1.35 \le (r1+r2)/(r1-r2) \le -0.83$ (14b)

$2.9 \le (r3+r4)/(r3-r4) \le 6.74$ (15b)

$-0.54 \le (r11+r12)/(r11-r12) \le 1.25$ (16b)

$0.04 \le f123/f45 \le 1.22$ (17b)

$-19.95 \le f45/f6 \le -1.29$ (18b)

The signs in the above conditional expressions have the same meanings as those in the preceding paragraph.

In the imaging lens composed of seven optical elements according to this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, numerical examples of the imaging lens according to this embodiment will be explained. In each numerical example, f denotes the focal length of the overall optical system of the imaging lens, Fno denotes an F-number, and ω denotes a half field of view. i denotes a surface number counted from the object side, r denotes a curvature radius, d denotes the distance on the optical axis between lens surfaces (surface distance), Nd denotes a refractive index at d-ray (reference wavelength), and νd denotes an Abbe number at d-ray. As for aspheric surfaces, an asterisk (*) after surface number i indicates that the surface concerned is an aspheric surface.

NUMERICAL EXAMPLE 1

The basic lens data of Numerical Example 1 is shown below in Table 1.

TABLE 1

Numerical Example 1 in mm f = 7.03
Fno = 1.8
ω(°) = 35.5

Surface Data

| Surface No. i | Curvature Radius r | Surface Distance d | Refractive Index Nd | Abbe Number ν d | |
|---|---|---|---|---|---|
| (Object Surface) | Infinity | Infinity | | | |
| 1 (Stop) | Infinity | −0.646 | | | |
| 2* | 3.175 | 0.943 | 1.544 | 55.57 | (=ν d1) |
| 3* | −98.729 | 0.109 | | | |
| 4* | Infinity | 0.351 | 1.535 | 55.66 | (=ν dN) |
| 5* | Infinity | 0.022 | | | |
| 6* | 6.603 | 0.289 | 1.639 | 23.25 | (=ν d2) |
| 7* | 3.216 | 0.631 | | | |
| 8* | 19.738 | 1.216 | 1.535 | 55.66 | (=ν d3) |
| 9* | −25.172 | 0.792 | | | |
| 10* | −8.048 | 0.580 | 1.535 | 55.66 | (=ν d4) |
| 11* | −3.251 | 0.030 | | | |
| 12* | −99.000 | 1.296 | 1.614 | 25.58 | (=ν d5) |
| 13* | 99.000 | 0.559 | | | |
| 14* | −20.796 | 0.721 | 1.535 | 55.66 | (=ν d6) |
| 15* | 3.511 | 0.340 | | | |
| 16 | Infinity | 0.210 | 1.517 | 64.20 | |
| 17 | Infinity | 0.672 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 5.68 | 1, 2, 3 | 7.50 |
| 2 | 6 | −10.15 | 4, 5 | 11.11 |
| 3 | 8 | 20.88 | Entrance Pupil Diameter | 3.90 |
| 4 | 10 | 9.78 | | |
| 5 | 12 | −80.39 | | |
| 6 | 14 | −5.56 | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 4.870E−04 | 2.100E−03 | 1.609E−03 | 6.019E−04 | −2.405E−02 | −2.769E−02 | −9.204E−03 |
| A6 | −5.001E−04 | 2.055E−04 | 4.134E−04 | 1.645E−03 | 1.127E−02 | 1.131E−02 | −1.415E−03 |
| A8 | 1.850E−04 | 1.400E−05 | 2.233E−05 | −1.097E−03 | −3.448E−03 | −2.758E−03 | 3.679E−04 |
| A10 | −3.162E−05 | 0.000E+00 | 0.000E+00 | 1.287E−04 | 3.769E−04 | 3.074E−04 | −1.296E−04 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

TABLE 1-continued

Numerical Example 1

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −8.012E−01 | 0.000E+00 | 0.000E+00 | 0.000E+00 | −6.464E+00 |
| A4 | −8.980E−03 | −6.099E−04 | −2.727E−04 | −1.084E−02 | 1.064E−03 | −2.540E−02 | −2.166E−02 |
| A6 | −1.524E−03 | 1.677E−03 | 5.831E−03 | 3.560E−03 | −3.510E−03 | 1.397E−03 | 3.022E−03 |
| A8 | −1.981E−04 | −2.870E−04 | −8.697E−04 | −1.245E−04 | 8.101E−04 | 3.713E−04 | −2.665E−04 |
| A10 | 9.885E−06 | −5.168E−05 | 3.187E−05 | 1.835E−04 | −1.052E−04 | −5.416E−05 | 1.442E−05 |
| A12 | 0.000E+00 | 0.000E+00 | 0.000E+00 | −9.956E−06 | 8.637E−06 | 2.750E−06 | −4.439E−07 |
| A14 | 0.000E+00 | 0.000E+00 | 0.000E+00 | 0.000E+00 | −4.124E−07 | −5.223E−08 | 5.879E−09 |
| A16 | 0.000E+00 | 0.000E+00 | 0.000E+00 | 0.000E+00 | 8.502E−09 | 1.266E−10 | 0.000E+00 |

In this example, the aberration correction optical element NE is located between the first lens L1 and the second lens L2.

As shown below, the imaging lens in Numerical Example 1 satisfies the conditional expressions (1) to (6) and the conditional expressions (8) to (18).

$TN/f = 0.07$ (1)

$dN/f = 0.05$ (2)

$vdN = 55.66$ (3)

$f/EPD = 1.8$ (4)

$f123/f = 1.07$ (5)

$|f5|/f4 = 8.22$ (6)

$f6/f = -0.79$ (8)

$vd1 - vd2 = 32.32$ (9)

$vd3 = 55.66$ (10)

$|vd4 - vd5| = 30.09$ (11)

$vd6 = 55.66$ (12)

$f1/f = 0.81$ (13)

$(r1+r2)/(r1-r2) = -0.94$ (14)

$(r3+r4)/(r3-r4) = 2.90$ (15)

$(r11+r12)/(r11-r12) = 0.71$ (16)

$f123/f45 = 0.67$ (17)

$f45/f6 = -2.00.$ (18)

Figure 2:
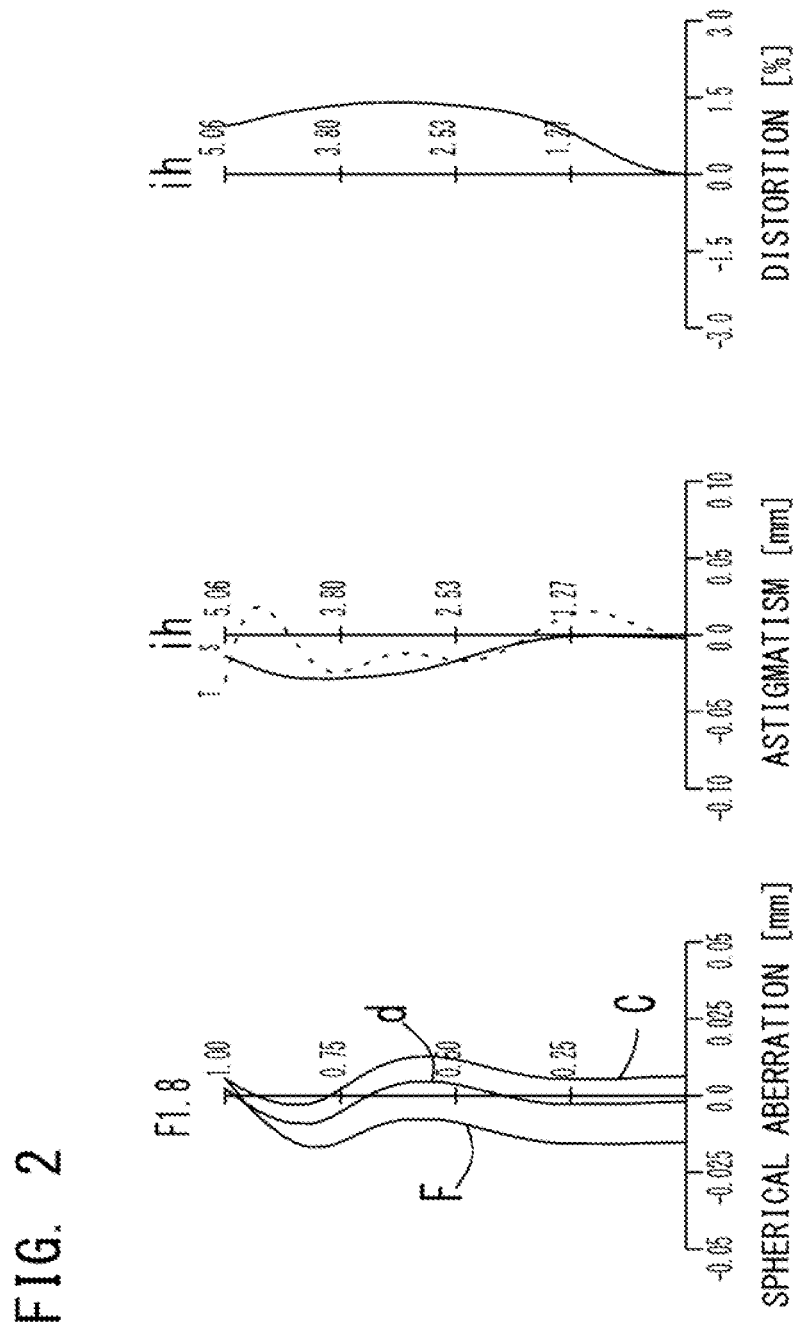
FIG. 2 shows spherical aberration, astigmatism, and distortion of the imaging lens in Numerical Example 1 according to the embodiment of the present invention.

FIG. 2 shows spherical aberration (mm), astigmatism (mm), and distortion (%) of the imaging lens in Numerical Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, 14, and 16). As shown in FIG. 2, each aberration is corrected properly.

NUMERICAL EXAMPLE 2

The basic lens data of Numerical Example 2 is shown below in Table 2.

TABLE 2

Numerical Example 2 in mm f = 7.17
Fno = 1.6
ω(°) = 35.0

Surface Data

| Surface No. i | Curvature Radius r | Surface Distance d | Refractive Index Nd | Abbe Number ν d | |
|---|---|---|---|---|---|
| (Object Surface) | Infinity | Infinity | | | |
| 1 (Stop) | Infinity | −0.699 | | | |
| 2* | 3.245 | 1.147 | 1.544 | 55.57 | (=ν d1) |
| 3* | −99.000 | 0.030 | | | |
| 4* | 3.792 | 0.300 | 1.635 | 23.97 | (=ν d2) |
| 5* | 2.323 | 0.686 | | | |
| 6* | 20.000 | 0.701 | 1.535 | 55.66 | (=ν d3) |
| 7* | −47.334 | 0.368 | | | |
| 8* | Infinity | 0.802 | 1.535 | 55.66 | (=ν dN) |
| 9* | Infinity | 0.475 | | | |
| 10* | −8.949 | 0.666 | 1.544 | 55.57 | (=ν d4) |
| 11* | −2.732 | 0.030 | | | |

TABLE 2-continued

Numerical Example 2

| | | | | | |
|---|---|---|---|---|---|
| 12* | −19.039 | 1.219 | 1.614 | 25.58 | (=ν d5) |
| 13* | 99.000 | 0.524 | | | |
| 14* | −99.000 | 0.723 | 1.535 | 55.66 | (=ν d6) |
| 15* | 3.189 | 0.340 | | | |
| 16 | Infinity | 0.210 | 1.517 | 64.20 | |
| 17 | Infinity | 0.801 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 5.80 | 1, 2, 3 | 8.07 |
| 2 | 4 | −10.25 | 4, 5 | 9.55 |
| 3 | 6 | 26.38 | Entrance Pupil Diameter | 4.38 |
| 4 | 10 | 6.97 | | |
| 5 | 12 | −25.90 | | |
| 6 | 14 | −5.76 | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 1.947E−03 | 2.585E−03 | −4.119E−02 | −4.920E−02 | −2.655E−03 | −1.256E−02 | −2.199E−02 |
| A6 | −4.505E−04 | 8.311E−04 | 1.244E−02 | 1.294E−02 | −1.884E−03 | −6.177E−04 | −3.426E−04 |
| A8 | 1.258E−04 | −2.373E−04 | −2.363E−03 | −2.557E−03 | 3.915E−04 | −8.713E−06 | 2.741E−04 |
| A10 | −6.339E−06 | 1.756E−05 | 1.869E−04 | 1.783E−04 | −8.979E−05 | 1.463E−05 | 0.000E+00 |
| A12 | 0.000E+00 | 0.000E+00 | 0.000E+00 | 4.914E−06 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −1.704E+00 | 0.000E+00 | 0.000E+00 | 0.000E+00 | −7.085E+00 |
| A4 | −1.720E−02 | −1.034E−02 | 3.167E−03 | 4.398E−03 | 5.327E−03 | −2.625E−02 | −1.987E−02 |
| A6 | −1.046E−03 | 3.370E−03 | 2.014E−03 | −3.017E−04 | −4.174E−03 | 1.062E−03 | 2.523E−03 |
| A8 | 1.767E−05 | −9.397E−04 | −5.353E−04 | −1.042E−03 | 8.852E−04 | 3.872E−04 | −2.293E−04 |
| A10 | 0.000E+00 | 5.903E−05 | 4.149E−05 | 3.045E−04 | −1.142E−04 | −5.232E−05 | 1.391E−05 |
| A12 | 0.000E+00 | 0.000E+00 | 0.000E+00 | −4.088E−05 | 8.880E−06 | 2.682E−06 | −4.719E−07 |
| A14 | 0.000E+00 | 0.000E+00 | 0.000E+00 | 2.086E−06 | −3.822E−07 | −5.775E−08 | 6.572E−09 |
| A16 | 0.000E+00 | 0.000E+00 | 0.000E+00 | 0.000E+00 | 7.074E−09 | 3.502E−10 | 0.000E+00 |

In this example, the aberration correction optical element NE is located between the third lens L3 and the fourth lens L4.

As shown below, the imaging lens in Numerical Example 2 satisfies the conditional expressions (1) to (6) and the conditional expressions (8) to (18).

$TN/f=0.23$ (1)

$dN/f=0.11$ (2)

$vdN=55.66$ (3)

$f/EPD=1.6$ (4)

$f123/f=1.13$ (5)

$|f5|/f4=3.72$ (6)

$f6/f=-0.8$ (8)

$vd1-vd2=31.6$ (9)

$vd3=55.66$ (10)

$|vd4-vd5|=29.99$ (11)

$vd6=55.66$ (12)

$f1/f=0.81$ (13)

$(r1+r2)/(r1-r2)=-0.94$ (14)

$(r3+r4)/(r3-r4)=4.16$ (15)

$(r11+r12)/(r11-r12)=0.94$ (16)

$f123/f45=0.85$ (17)

$f45/f6=-1.66.$ (18)

Figure 4:
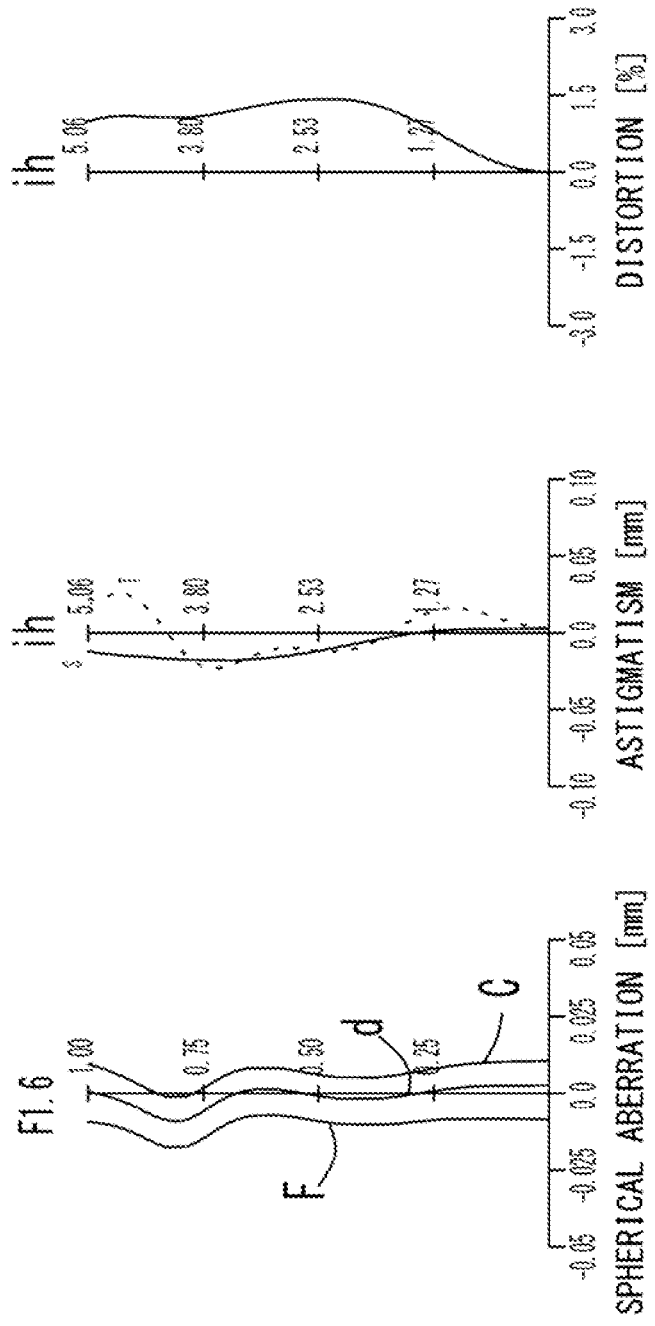
FIG. 4 shows spherical aberration, astigmatism, and distortion of the imaging lens in Numerical Example 2 according to the embodiment of the present invention.

FIG. 4 shows spherical aberration (mm), astigmatism (mm), and distortion (%) of the imaging lens in Numerical Example 2. As shown in FIG. 4, each aberration is corrected properly.

NUMERICAL EXAMPLE 3

The basic lens data of Numerical Example 3 is shown below in Table 3.

TABLE 3

Numerical Example 3

*in mm*

$f = 6.91$
$Fno = 2.1$
$\omega(°) = 36.0$

Surface Data

| Surface No. i | Curvature Radius r | Surface Distance d | Refractive Index Nd | Abbe Number ν d | |
|---|---|---|---|---|---|
| (Object Surface) | Infinity | Infinity | | | |
| 1 (Stop) | Infinity | −0.419 | | | |
| 2* | 3.571 | 0.734 | 1.544 | 55.57 | (=ν d1) |
| 3* | −37.353 | 0.154 | | | |
| 4* | 4.285 | 0.402 | 1.635 | 23.97 | (=ν d2) |
| 5* | 2.452 | 0.732 | | | |
| 6* | 15.056 | 1.498 | 1.535 | 55.66 | (=ν d3) |
| 7* | −14.022 | 0.773 | | | |
| 8* | −5.726 | 0.857 | 1.535 | 55.66 | (=ν d4) |
| 9* | −2.040 | 0.030 | | | |
| 10* | −20.353 | 0.712 | 1.614 | 25.58 | (=ν d5) |
| 11* | 32.334 | 0.334 | | | |
| 12* | 20.588 | 0.677 | 1.535 | 55.66 | (=ν d6) |
| 13* | 2.287 | 0.358 | | | |
| 14* | Infinity | 0.567 | 1.535 | 55.66 | (=ν dN) |
| 15* | Infinity | 0.300 | | | |
| 16 | Infinity | 0.210 | 1.517 | 64.20 | |
| 17 | Infinity | 0.575 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 6.03 | 1, 2, 3 | 7.29 |
| 2 | 4 | −9.86 | 4, 5 | 7.56 |
| 3 | 6 | 13.82 | Entrance Pupil Diameter | 3.29 |
| 4 | 8 | 5.48 | | |
| 5 | 10 | −20.23 | | |
| 6 | 12 | −4.87 | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.958E−03 | 3.700E−03 | −3.500E−02 | −4.636E−02 | −5.817E−03 | −5.864E−03 | −1.111E−03 |
| A6 | −5.816E−04 | 1.596E−03 | 1.217E−02 | 1.314E−02 | −1.309E−03 | −2.003E−03 | 2.132E−03 |
| A8 | 3.708E−04 | −3.538E−04 | −2.793E−03 | −2.995E−03 | 5.144E−04 | 3.694E−05 | −9.943E−04 |
| A10 | −1.587E−05 | 3.517E−06 | 1.444E−04 | 1.896E−04 | −9.507E−05 | −1.094E−05 | 6.648E−05 |
| A12 | 0.000E+00 | 0.000E+00 | 0.000E+00 | 6.141E−06 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | −3.083E+00 | 0.000E+00 | 0.000E+00 | 0.000E+00 | −6.691E+00 | 0.000E+00 | 0.000E+00 |
| A4 | −7.152E−04 | 3.348E−03 | 2.307E−03 | −2.815E−02 | −2.114E−02 | −1.536E−03 | 1.060E−03 |
| A6 | 1.460E−03 | −8.732E−04 | −4.339E−03 | 1.007E−03 | 2.424E−03 | 3.785E−05 | −4.052E−05 |
| A8 | −5.202E−04 | −1.029E−03 | 8.988E−04 | 3.880E−04 | −2.287E−04 | 1.059E−07 | −1.726E−06 |
| A10 | 4.827E−05 | 3.057E−04 | −1.130E−04 | −5.220E−05 | 1.450E−05 | 0.000E+00 | 0.000E+00 |
| A12 | 0.000E+00 | −4.080E−05 | 8.784E−06 | 2.693E−06 | −4.743E−07 | 0.000E+00 | 0.000E+00 |
| A14 | 0.000E+00 | 2.040E−06 | −3.870E−07 | −5.591E−08 | 6.089E−09 | 0.000E+00 | 0.000E+00 |
| A16 | 0.000E+00 | 0.000E+00 | 7.464E−09 | 2.296E−10 | 0.000E+00 | 0.000E+00 | 0.000E+00 |

In this example, the aberration correction optical element NE is located between the sixth lens L6 and the image plane IMG.

As shown below, the imaging lens in Numerical Example 3 satisfies the conditional expressions (1) to (6) and the conditional expressions (8) to (18).

$TN/f = 0.28$     (1)

$dN/f = 0.08$     (2)

$vdN = 55.66$     (3)

$f/EPD = 2.1$     (4)

$f123/f=1.06$ (5)

$|f5|/f4=3.69$ (6)

$f6/f=-0.71$ (8)

$vd1-vd2=31.6$ (9)

$vd3=55.66$ (10)

$|vd4-vd5|=30.09$ (11)

$vd6=55.66$ (12)

$f1/f=0.87$ (13)

$(r1+r2)/(r1-r2)=-0.83$ (14)

$(r3+r4)/(r3-r4)=3.67$ (15)

$(r11+r12)/(r11-r12)=1.25$ (16)

$f123/f45=0.96$ (17)

$f45/f6=-1.55.$ (18)

Figure 6:
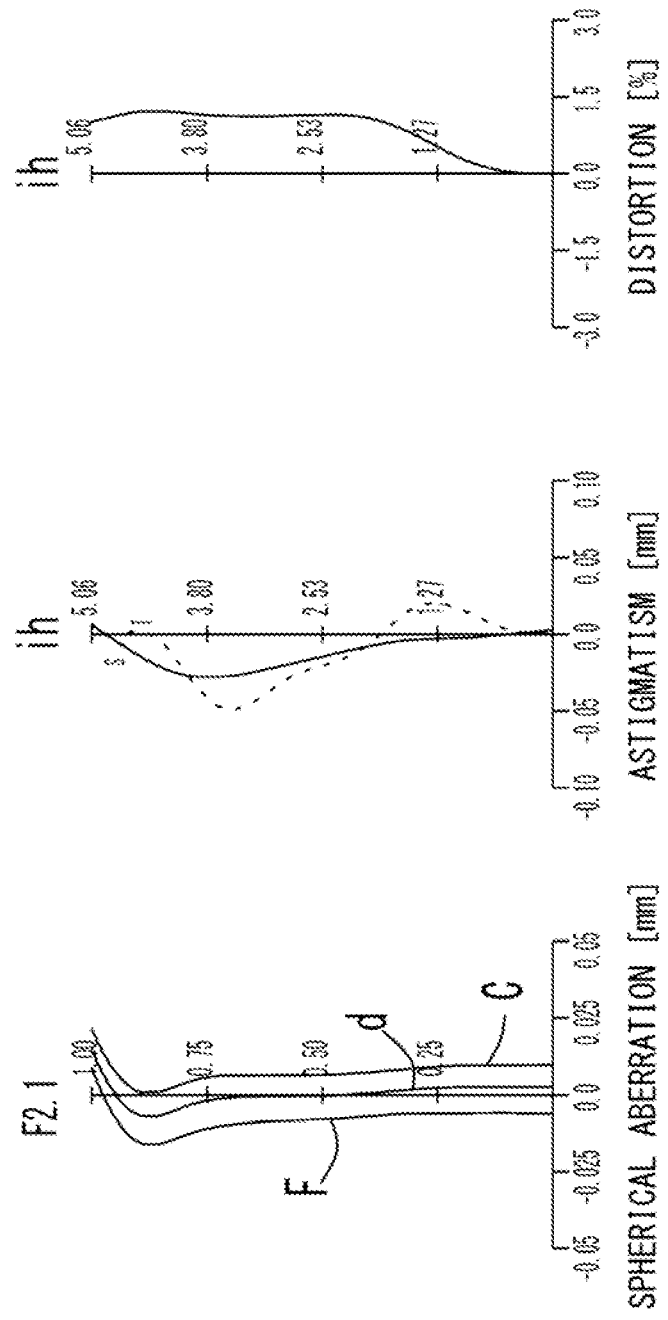
FIG. 6 shows spherical aberration, astigmatism, and distortion of the imaging lens in Numerical Example 3 according to the embodiment of the present invention.

FIG. 6 shows spherical aberration (mm), astigmatism (mm), and distortion (%) of the imaging lens in Numerical Example 3. As shown in FIG. 6, each aberration is corrected properly.

NUMERICAL EXAMPLE 4

The basic lens data of Numerical Example 4 is shown below in Table 4.

TABLE 4

Numerical Example 4 in mm f = 7.17
Fno = 1.8
ω(°) = 35.0

Surface Data

| Surface No. i (Object Surface) | Curvature Radius r | Surface Distance d | Refractive Index Nd | Abbe Number ν d | |
|---|---|---|---|---|---|
| (Object Surface) | Infinity | Infinity | | | |
| 1 (Stop) | Infinity | -0.719 | | | |
| 2* | 3.101 | 1.008 | 1.544 | 55.57 | (=ν d1) |
| 3* | -105.032 | 0.030 | | | |
| 4* | 3.948 | 0.300 | 1.635 | 23.97 | (=ν d2) |
| 5* | 2.400 | 1.035 | | | |
| 6* | 20.838 | 1.018 | 1.535 | 55.66 | (=ν d3) |
| 7* | 17.123 | 0.107 | | | |
| 8* | Infinity | 0.749 | 1.535 | 55.66 | (=ν dN) |
| 9* | Infinity | 0.211 | | | |
| 10* | -68.431 | 0.708 | 1.544 | 55.57 | (=ν d4) |
| 11* | -3.096 | 0.094 | | | |
| 12* | -16.277 | 1.059 | 1.614 | 25.58 | (=ν d5) |
| 13* | 99.000 | 0.798 | | | |
| 14* | 60.929 | 0.677 | 1.535 | 55.66 | (=ν d6) |
| 15* | 3.116 | 0.340 | | | |
| 16 | Infinity | 0.210 | 1.517 | 64.20 | |
| 17 | Infinity | 0.730 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 5.56 | 1, 2, 3 | 9.72 |
| 2 | 4 | -10.43 | 4, 5 | 7.97 |
| 3 | 6 | -198.55 | Entrance Pupil Diameter | 3.90 |
| 4 | 10 | 5.94 | | |
| 5 | 12 | -22.68 | | |
| 6 | 14 | -6.17 | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.729E-03 | 2.789E-03 | -3.857E-02 | -4.530E-02 | -5.722E-03 | -1.327E-02 | -1.643E-02 |
| A6 | -3.816E-04 | 7.342E-04 | 1.293E-02 | 1.409E-02 | -1.100E-03 | -6.278E-04 | 3.976E-04 |
| A8 | 1.019E-04 | -1.432E-04 | -2.327E-03 | -2.391E-03 | 2.436E-04 | -7.069E-05 | 1.616E-04 |
| A10 | 4.292E-06 | 1.091E-06 | 1.515E-04 | 6.743E-05 | -6.109E-05 | 3.817E-06 | 0.000E+00 |
| A12 | 0.000E+00 | 0.000E+00 | 0.000E+00 | 3.066E-05 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | -1.417E+00 | 0.000E+00 | 0.000E+00 | 0.000E+00 | -5.216E+00 |
| A4 | -1.791E-02 | -1.725E-02 | 3.325E-03 | 6.284E-03 | 6.519E-03 | -2.745E-02 | -2.075E-02 |
| A6 | -4.885E-04 | 3.090E-03 | 2.141E-03 | -2.754E-04 | -4.211E-03 | 1.074E-03 | 2.598E-03 |

TABLE 4-continued

Numerical Example 4

| | | | | | | | |
|---|---|---|---|---|---|---|---|
| A8 | 1.510E−04 | −7.746E−04 | −5.581E−04 | −1.031E−03 | 8.857E−04 | 3.881E−04 | −2.322E−04 |
| A10 | 0.000E+00 | 5.450E−05 | 4.065E−05 | 3.059E−04 | −1.144E−04 | −5.227E−05 | 1.390E−05 |
| A12 | 0.000E+00 | 0.000E+00 | 0.000E+00 | −4.099E−05 | 8.841E−06 | 2.675E−06 | −4.632E−07 |
| A14 | 0.000E+00 | 0.000E+00 | 0.000E+00 | 2.021E−06 | −3.832E−07 | −5.813E−08 | 6.269E−09 |
| A16 | 0.000E+00 | 0.000E+00 | 0.000E+00 | 0.000E+00 | 7.355E−09 | 3.794E−10 | 0.000E+00 |

In this example, the aberration correction optical element NE is located between the third lens L3 and the fourth lens L4.

As shown below, the imaging lens in Numerical Example 4 satisfies the conditional expressions (1) to (6) and the conditional expressions (8) to (18).

$TN/f = 0.15$ (1)

$dN/f = 0.1$ (2)

$vdN = 55.66$ (3)

$f/EPD = 1.8$ (4)

$f123/f = 1.36$ (5)

$|f5|/f4 = 3.82$ (6)

$f6/f = -0.86$ (8)

$vd1 - vd2 = 31.6$ (9)

$vd3 = 55.66$ (10)

$|vd4 - vd5| = 29.99$ (11)

$vd6 = 55.66$ (12)

$f1/f = 0.78$ (13)

$(r1 + r2)/(r1 - r2) = -0.94$ (14)

$(r3 + r4)/(r3 - r4) = 4.1$ (15)

$(r11 + r12)/(r11 - r12) = 1.11$ (16)

$f123/f45 = 1.22$ (17)

$f45/f6 = -1.29.$ (18)

Figure 8:
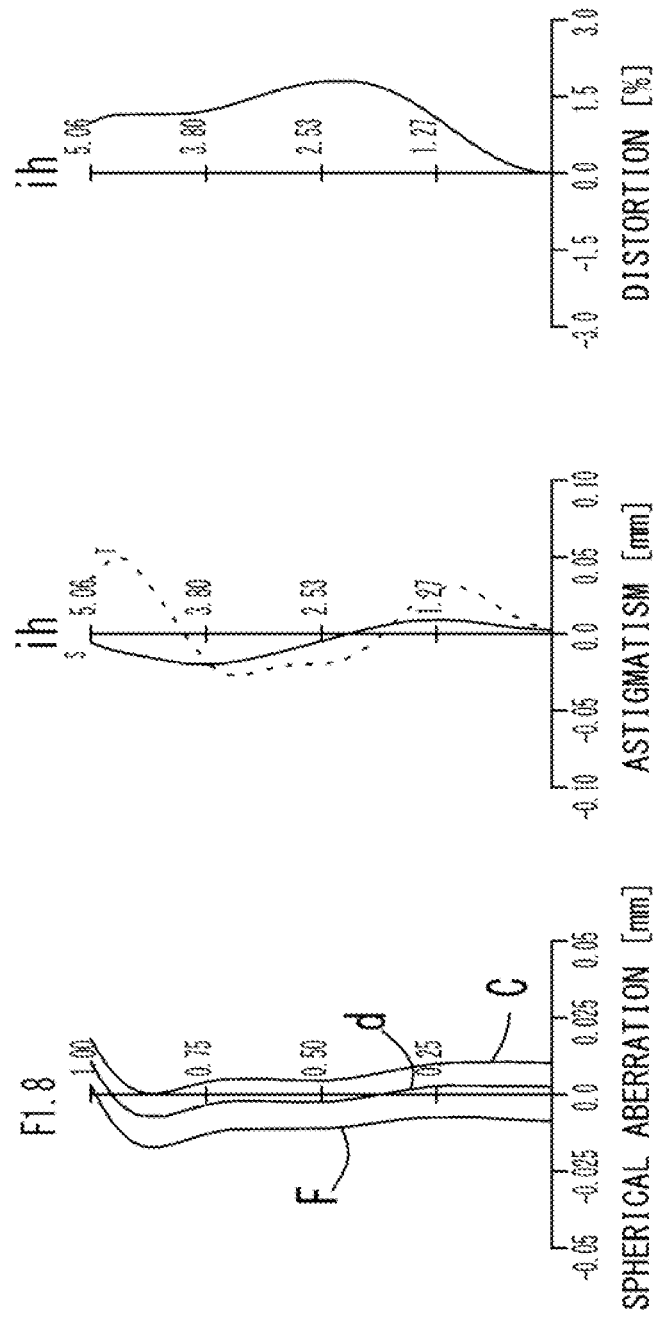
FIG. 8 shows spherical aberration, astigmatism, and distortion of the imaging lens in Numerical Example 4 according to the embodiment of the present invention.

FIG. 8 shows spherical aberration (mm), astigmatism (mm), and distortion (%) of the imaging lens in Numerical Example 4. As shown in FIG. 8, each aberration is corrected properly.

NUMERICAL EXAMPLE 5

The basic lens data of Numerical Example 5 is shown below in Table 5.

TABLE 5

Numerical Example 5 in mm f = 6.69
Fno = 1.6
ω(°) = 36.8

Surface Data

| Surface No. i | Curvature Radius r | Surface Distance d | Refractive Index Nd | Abbe Number v d | |
|---|---|---|---|---|---|
| (Object Surface) | Infinity | Infinity | | | |
| 1 (Stop) | Infinity | −0.705 | | | |
| 2* | 3.371 | 1.078 | 1.544 | 55.57 | (=v d1) |
| 3* | −75.533 | 0.030 | | | |
| 4* | 3.456 | 0.320 | 1.635 | 23.97 | (=v d2) |
| 5* | 2.196 | 0.771 | | | |
| 6* | −99.000 | 0.569 | 1.535 | 55.66 | (=v d3) |
| 7* | −8.417 | 0.040 | | | |
| 8* | Infinity | 0.819 | 1.535 | 55.66 | (=v dN) |
| 9* | Infinity | 0.774 | | | |
| 10* | −8.939 | 0.685 | 1.544 | 55.57 | (=v d4) |
| 11* | −2.547 | 0.030 | | | |
| 12* | −14.314 | 1.100 | 1.614 | 25.58 | (=v d5) |
| 13* | 97.150 | 0.542 | | | |
| 14* | −95.113 | 0.665 | 1.535 | 55.66 | (=v d6) |
| 15* | 2.894 | 0.340 | | | |
| 16 | Infinity | 0.210 | 1.517 | 64.20 | |
| 17 | Infinity | 0.695 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 5.96 | 1, 2, 3 | 7.43 |
| 2 | 4 | −10.53 | 4, 5 | 9.21 |
| 3 | 6 | 17.16 | Entrance Pupil Diameter | 4.08 |

TABLE 5-continued

Numerical Example 5

| | | |
|---|---|---|
| 4 | 10 | 6.31 |
| 5 | 12 | −20.24 |
| 6 | 14 | −5.24 |

Aspheric Surface Data

| | 2nd Surface | 3rd Surface | 4th Surface | 5th Surface | 6th Surface | 7th Surface | 8th Surface |
|---|---|---|---|---|---|---|---|
| k   | 0.000E+00  | 0.000E+00  | 0.000E+00  | 0.000E+00  | 0.000E+00  | 0.000E+00  | 0.000E+00  |
| A4  | 2.336E−03  | 3.922E−03  | −4.066E−02 | −5.007E−02 | 3.850E−03  | −6.592E−03 | −1.903E−02 |
| A6  | −8.379E−04 | 6.055E−04  | 1.182E−02  | 1.220E−02  | −2.941E−03 | −1.328E−03 | 2.583E−04  |
| A8  | 2.847E−04  | −1.077E−04 | −2.344E−03 | −2.840E−03 | 4.507E−04  | 2.404E−04  | 3.395E−04  |
| A10 | −2.347E−05 | −1.347E−05 | 1.522E−04  | 3.027E−04  | −3.684E−05 | 4.153E−05  | 0.000E+00  |
| A12 | 0.000E+00  | 0.000E+00  | 0.000E+00  | −2.780E−05 | 0.000E+00  | 0.000E+00  | 0.000E+00  |
| A14 | 0.000E+00  | 0.000E+00  | 0.000E+00  | 0.000E+00  | 0.000E+00  | 0.000E+00  | 0.000E+00  |
| A16 | 0.000E+00  | 0.000E+00  | 0.000E+00  | 0.000E+00  | 0.000E+00  | 0.000E+00  | 0.000E+00  |

| | 9th Surface | 10th Surface | 11th Surface | 12th Surface | 13th Surface | 14th Surface | 15th Surface |
|---|---|---|---|---|---|---|---|
| k   | 0.000E+00  | 0.000E+00  | −2.634E+00 | 0.000E+00  | 0.000E+00  | 0.000E+00  | −7.005E+00 |
| A4  | −1.356E−02 | −6.595E−03 | 2.351E−03  | 6.077E−03  | 5.341E−03  | −2.575E−02 | −1.918E−02 |
| A6  | −7.280E−04 | 3.611E−03  | 1.843E−03  | −4.099E−04 | −4.102E−03 | 1.012E−03  | 2.539E−03  |
| A8  | −7.937E−05 | −1.015E−03 | −5.420E−04 | −1.069E−03 | 8.805E−04  | 3.855E−04  | −2.415E−04 |
| A10 | 0.000E+00  | 6.086E−05  | 4.163E−05  | 3.083E−04  | −1.138E−04 | −5.203E−05 | 1.447E−05  |
| A12 | 0.000E+00  | 0.000E+00  | 0.000E+00  | −3.964E−05 | 8.852E−06  | 2.681E−06  | −4.700E−07 |
| A14 | 0.000E+00  | 0.000E+00  | 0.000E+00  | 1.923E−06  | −3.821E−07 | −5.830E−08 | 6.261E−09  |
| A16 | 0.000E+00  | 0.000E+00  | 0.000E+00  | 0.000E+00  | 7.067E−09  | 3.629E−10  | 0.000E+00  |

In this example, the aberration correction optical element NE is located between the third lens L3 and the fourth lens L4.

As shown below, the imaging lens in Numerical Example 5 satisfies the conditional expressions (1) to (6) and the conditional expressions (8) to (18).

$TN/f = 0.24$   (1)

$dN/f = 0.12$   (2)

$vdN = 55.66$   (3)

$f/EPD = 1.6$   (4)

$f123/f = 1.11$   (5)

$|f5|/f4 = 3.21$   (6)

$f6/f = -0.78$   (8)

$vd1 - vd2 = 31.6$   (9)

$vd3 = 55.66$   (10)

$|vd4 - vd5| = 29.99$   (11)

$vd6 = 55.66$   (12)

$f1/f = 0.89$   (13)

$(r1 + r2)/(r1 - r2) = -0.91$   (14)

$(r3 + r4)/(r3 - r4) = 4.49$   (15)

$(r11 + r12)/(r11 - r12) = 0.94$   (16)

$f123/f45 = 0.81$   (17)

$f45/f6 = -1.76.$   (18)

Figure 10:
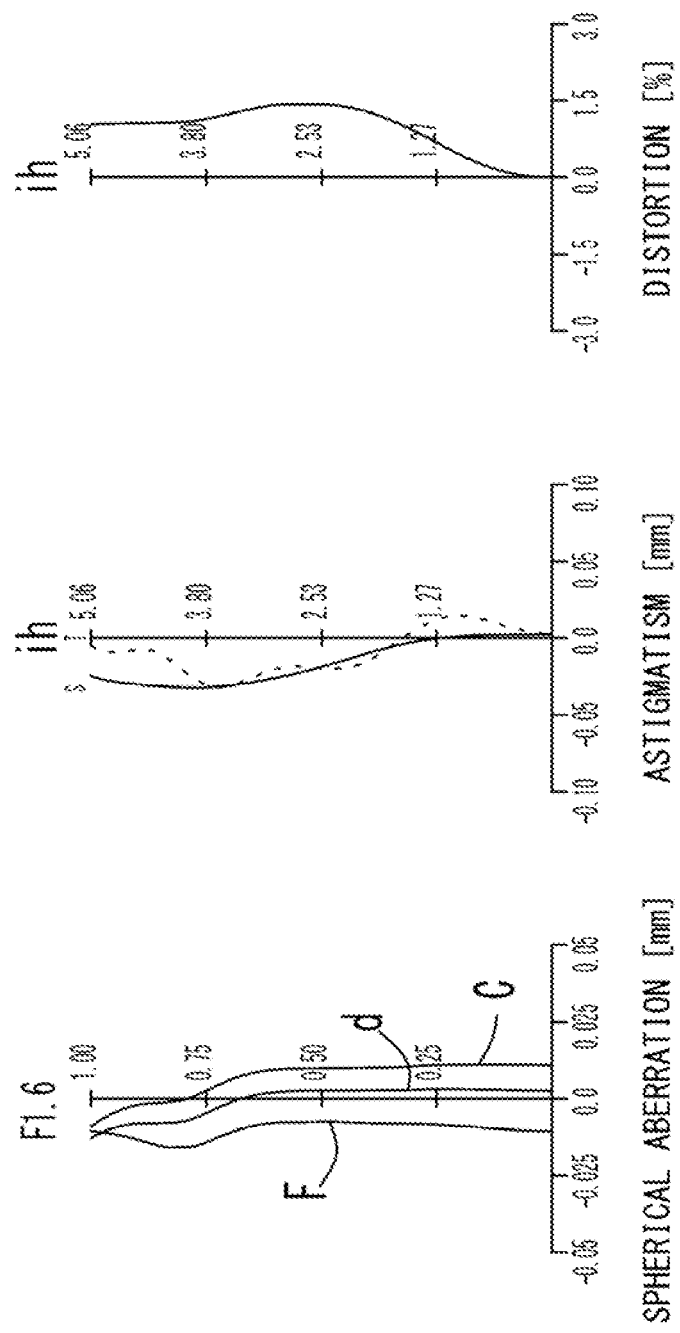
FIG. 10 shows spherical aberration, astigmatism, and distortion of the imaging lens in Numerical Example 5 according to the embodiment of the present invention.

FIG. 10 shows spherical aberration (mm), astigmatism (mm), and distortion (%) of the imaging lens in Numerical Example 5. As shown in FIG. 10, each aberration is corrected properly.

NUMERICAL EXAMPLE 6

The basic lens data of Numerical Example 6 is shown below in Table 6.

TABLE 6

Numerical Example 6 in mm f = 6.68
Fno = 1.6
ω(°) = 36.9

Surface Data

| Surface No. i | Curvature Radius r | Surface Distance d | Refractive Index Nd | Abbe Number ν d | |
|---|---|---|---|---|---|
| (Object Surface) | Infinity | Infinity | | | |
| 1 (Stop) | Infinity | −0.686 | | | |
| 2* | 3.585 | 0.922 | 1.544 | 55.57 | (=ν d1) |
| 3* | 39.113 | 0.286 | | | |
| 4* | 3.133 | 0.329 | 1.639 | 23.25 | (=ν d2) |
| 5* | 2.172 | 0.686 | | | |

TABLE 6-continued

Numerical Example 6

| | | | | | |
|---|---|---|---|---|---|
| 6* | Infinity | 0.331 | 1.535 | 55.66 | (=ν dN) |
| 7* | Infinity | 0.053 | | | |
| 8* | 8.892 | 0.843 | 1.535 | 55.66 | (=ν d3) |
| 9* | −9.328 | 0.611 | | | |
| 10* | −2.068 | 0.659 | 1.614 | 25.58 | (=ν d4) |
| 11* | −3.234 | 0.031 | | | |
| 12* | 4.239 | 1.342 | 1.544 | 55.57 | (=ν d5) |
| 13* | −11.810 | 0.961 | | | |
| 14* | −3.439 | 0.683 | 1.535 | 55.66 | (=ν d6) |
| 15* | 11.461 | 0.220 | | | |
| 16 | Infinity | 0.210 | 1.517 | 64.20 | |
| 17 | Infinity | 0.695 | | | |
| Image Plane | Infinity | | | | |

| Constituent Lens Data | | | Composite Focal Length | | |
|---|---|---|---|---|---|
| Lens | Start Surface | Focal Length | Lens | | Focal Length |
| 1 | 2 | 7.19 | 1, 2, 3 | | 6.20 |
| 2 | 4 | −12.79 | 4, 5 | | 9.14 |
| 3 | 8 | 8.65 | Entrance Pupil Diameter | | 4.06 |
| 4 | 10 | −11.89 | | | |
| 5 | 12 | 5.91 | | | |
| 6 | 14 | −4.87 | | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 1.570E+00 | 0.000E+00 | −9.543E+00 | −5.213E+00 | 0.000E+00 | 0.000E+00 | −5.272E+01 |
| A4 | −2.962E−03 | −5.733E−03 | −2.646E−02 | −9.386E−03 | 5.375E−03 | −6.154E−03 | −1.101E−02 |
| A6 | −1.313E−04 | 4.135E−03 | 8.098E−03 | 3.549E−03 | −2.027E−03 | 1.896E−03 | 2.608E−04 |
| A8 | 9.382E−05 | −7.610E−04 | −1.303E−03 | −5.096E−04 | −6.159E−05 | −8.516E−05 | 2.782E−04 |
| A10 | −2.070E−04 | 7.661E−06 | −2.659E−05 | 6.179E−05 | −3.469E−05 | −8.407E−05 | −1.887E−05 |
| A12 | 7.030E−05 | 2.210E−05 | 4.044E−05 | −1.742E−05 | 0.000E+00 | 0.000E+00 | −3.962E−06 |
| A14 | −8.315E−06 | −2.130E−06 | −6.834E−06 | 1.820E−06 | 0.000E+00 | 0.000E+00 | 9.816E−07 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 1.033E+01 | −3.298E+00 | −3.821E+00 | −1.257E+01 | −2.699E+01 | −6.805E+00 | −5.875E+00 |
| A4 | −4.588E−03 | 2.668E−02 | 9.936E−03 | −5.566E−03 | 4.150E−03 | −1.143E−02 | −5.862E−03 |
| A6 | −1.268E−03 | −9.073E−03 | −2.719E−03 | 7.108E−04 | −9.564E−04 | 6.548E−04 | 2.213E−04 |
| A8 | −2.197E−05 | 2.087E−03 | 6.089E−04 | −1.828E−04 | 1.506E−04 | 4.869E−06 | −1.750E−05 |
| A10 | 2.348E−05 | −2.781E−04 | −7.086E−05 | 1.113E−05 | −2.171E−05 | −3.769E−07 | 3.629E−07 |
| A12 | 5.504E−06 | 2.696E−05 | 6.907E−06 | −2.242E−07 | 1.537E−06 | 4.536E−09 | 4.184E−09 |
| A14 | 2.318E−07 | −1.610E−06 | −3.694E−07 | −1.699E−08 | −4.394E−08 | −4.949E−10 | 1.579E−10 |
| A16 | 0.000E+00 | 0.000E+00 | 0.000E+00 | 0.000E+00 | 0.000E+00 | 0.000E+00 | 0.000E+00 |

In this example, the aberration correction optical element NE is located between the second lens L2 and the third lens L3.

As shown below, the imaging lens in Numerical Example 6 satisfies the conditional expressions (1) to (5) and the conditional expressions (7) to (18).

$TN/f=0.16$ (1)

$dN/f=0.05$ (2)

$vdN=55.66$ (3)

$f/EPD=1.6$ (4)

$f123/f=0.93$ (5)

$|f4|/f5=2.01$ (7)

$f6/f=-0.73$ (8)

$vd1-vd2=32.32$ (9)

$vd3=55.66$ (10)

$|vd4-vd5|=29.99$ (11)

$vd6=55.66$ (12)

$f1/f=1.08$ (13)

$(r1+r2)/(r1-r2)=-1.2$ (14)

$(r3+r4)/(r3-r4)=5.52$ (15)

$(r11+r12)/(r11-r12)=-0.54$ (16)

$f123/f45=0.68$ (17)

$f45/f6=-1.88.$ (18)

Figure 12:
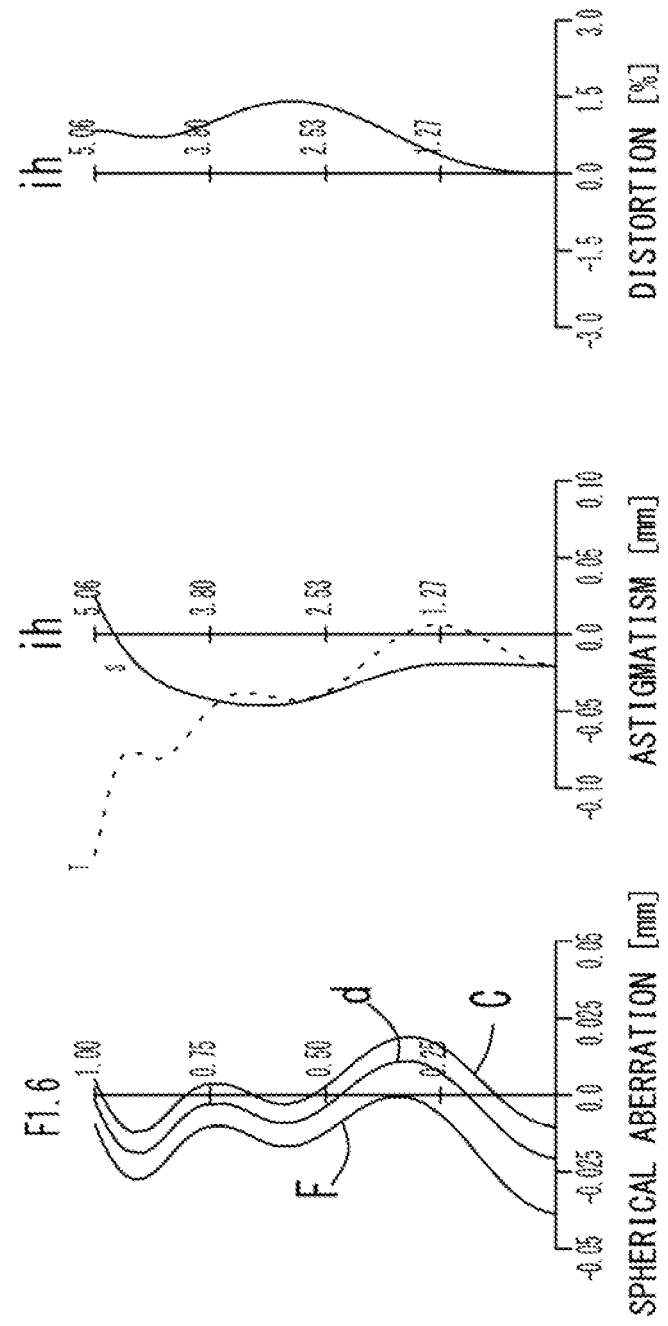
FIG. 12 shows spherical aberration, astigmatism, and distortion of the imaging lens in Numerical Example 6 according to the embodiment of the present invention.

FIG. 12 shows spherical aberration (mm), astigmatism (mm), and distortion (%) of the imaging lens in Numerical Example 6. As shown in FIG. 12, each aberration is corrected properly.

NUMERICAL EXAMPLE 7

The basic lens data of Numerical Example 7 is shown below in Table 7.

TABLE 7

Numerical Example 7 in mm $f = 7.04$
$Fno = 2.0$
$\omega(°) = 35.5$

Surface Data

| Surface No. i | Curvature Radius r | Surface Distance d | Refractive Index Nd | Abbe Number ν d | |
|---|---|---|---|---|---|
| (Object Surface) | Infinity | Infinity | | | |
| 1 (Stop) | Infinity | −0.563 | | | |
| 2* | 3.185 | 0.955 | 1.544 | 55.57 | (=ν d1) |
| 3* | 21.247 | 0.161 | | | |
| 4* | 4.170 | 0.269 | 1.639 | 23.25 | (=ν d2) |
| 5* | 3.092 | 0.479 | | | |
| 6* | 35.925 | 0.904 | 1.535 | 55.66 | (=ν d3) |
| 7* | −5.595 | 0.230 | | | |
| 8* | −3.159 | 1.123 | 1.614 | 25.58 | (=ν d4) |
| 9* | −6.352 | 0.066 | | | |
| 10* | Infinity | 0.500 | 1.535 | 55.66 | (=ν dN) |
| 11* | Infinity | 0.314 | | | |
| 12* | 3.815 | 0.920 | 1.544 | 55.57 | (=ν d5) |
| 13* | 8.008 | 0.954 | | | |
| 14* | −24.533 | 0.917 | 1.535 | 55.66 | (=ν d6) |
| 15* | 3.921 | 0.300 | | | |
| 16 | Infinity | 0.210 | 1.517 | 64.20 | |
| 17 | Infinity | 0.637 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 6.76 | 1, 2, 3 | 5.29 |
| 2 | 4 | −20.73 | 4, 5 | 124.72 |
| 3 | 6 | 9.12 | Entrance Pupil Diameter | 3.50 |
| 4 | 8 | −11.81 | | |
| 5 | 12 | 12.43 | | |
| 6 | 14 | −6.25 | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | −9.541E+00 | −8.827E+00 | −6.537E+00 | 0.000E+00 | 4.743E+00 | −4.879E+00 |
| A4 | 4.036E−03 | −5.014E−03 | −3.517E−02 | −2.610E−02 | −1.476E−02 | −8.479E−03 | −2.167E−02 |
| A6 | −3.033E−03 | −1.288E−03 | 2.860E−03 | 4.174E−03 | 3.283E−03 | −1.782E−03 | 1.257E−03 |
| A8 | 3.428E−03 | 8.005E−03 | 1.043E−02 | −5.571E−04 | −7.073E−03 | −1.588E−03 | −1.425E−03 |
| A10 | −1.775E−03 | −6.544E−03 | −1.004E−02 | −1.499E−04 | 4.614E−03 | 1.072E−03 | 8.097E−04 |
| A12 | 5.420E−04 | 2.647E−03 | 4.501E−03 | 8.451E−05 | −1.821E−03 | −3.030E−04 | −2.776E−04 |
| A14 | −8.540E−05 | −5.469E−04 | −1.043E−03 | −2.129E−05 | 4.294E−04 | 4.267E−05 | 4.764E−05 |
| A16 | 5.834E−06 | 4.528E−05 | 9.707E−05 | 2.963E−06 | −4.494E−05 | −2.475E−06 | −2.466E−06 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | 0.000E+00 | −7.888E+00 | 0.000E+00 | 0.000E+00 | −4.352E−01 |
| A4 | −4.712E−03 | −4.1587E−04 | −1.304E−02 | 6.314E−03 | 1.824E−02 | −2.214E−02 | −3.253E−02 |
| A6 | 4.800E−04 | −9.942E−05 | 1.818E−03 | −1.007E−02 | −1.258E−02 | 1.134E−03 | 4.438E−03 |
| A8 | −3.037E−05 | −1.530E−05 | 2.816E−04 | 2.746E−03 | 3.014E−03 | 2.653E−04 | −5.084E−04 |
| A10 | 2.057E−06 | −3.813E−06 | −1.019E−04 | −4.385E−04 | −4.332E−04 | −3.732E−05 | 4.074E−05 |
| A12 | 3.130E−06 | 8.760E−07 | 8.705E−06 | 3.628E−05 | 3.706E−05 | 1.907E−06 | −2.029E−06 |
| A14 | 4.711E−07 | 4.518E−07 | 1.472E−07 | −1.265E−06 | −1.704E−06 | −3.835E−08 | 5.469E−08 |
| A16 | 0.000E+00 | −5.702E−08 | −4.186E−08 | 8.138E−09 | 3.209E−08 | 0.000E+00 | −6.089E−10 |

In this example, the aberration correction optical element NE is located between the fourth lens L4 and the fifth lens L5.

As shown below, the imaging lens in Numerical Example 7 satisfies the conditional expressions (1) to (5) and the conditional expressions (7) to (18).

$TN/f = 0.12$     (1)

$dN/f = 0.07$     (2)

$vdN = 55.66$     (3)

$f/EPD = 2.0$     (4)

| | |
|---|---|
| $f123/f=0.75$ | (5) |
| $|f4|/f5=0.95$ | (7) |
| $f6/f=-0.89$ | (8) |
| $vd1-vd2=32.32$ | (9) |
| $vd3=55.66$ | (10) |
| $|vd4-vd5|=29.99$ | (11) |
| $vd6=55.66$ | (12) |
| $f1/f=0.96$ | (13) |
| $(r1+r2)/(r1-r2)=-1.35$ | (14) |
| $(r3+r4)/(r3-r4)=6.74$ | (15) |
| $(r11+r12)/(r11-r12)=0.72$ | (16) |
| $f123/f45=0.04$ | (17) |
| $f45/f6=-19.95.$ | (18) |

Figure 14:
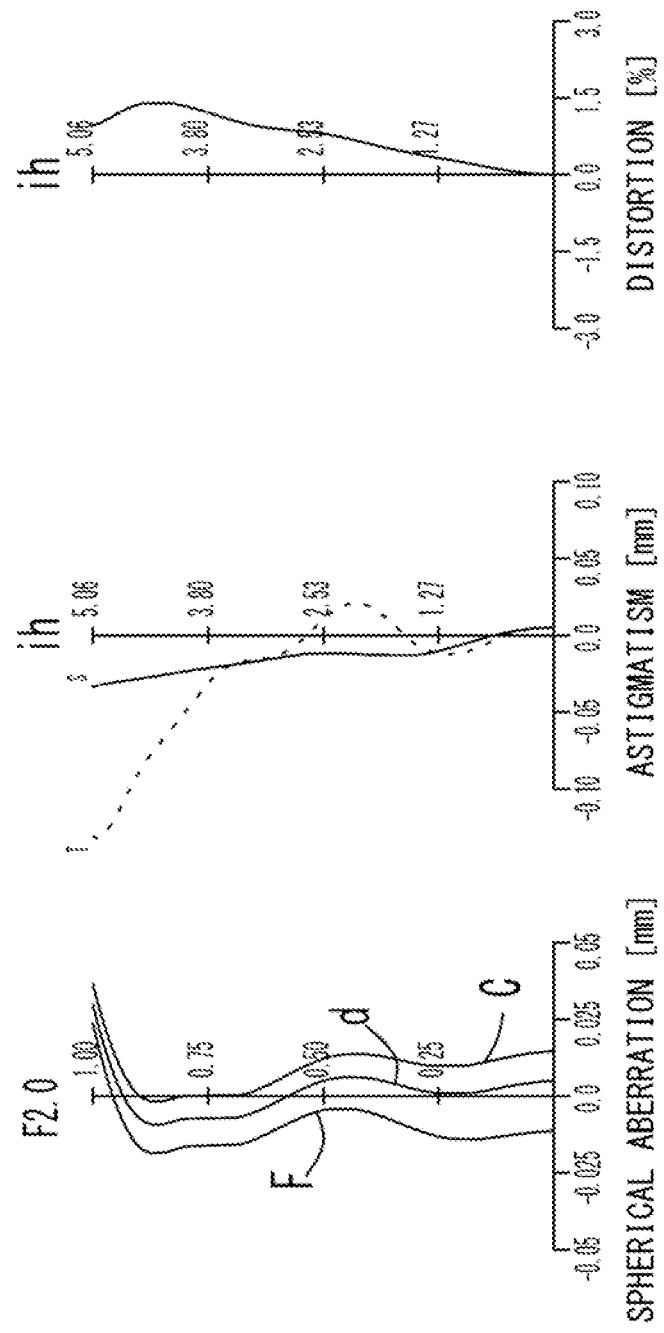
FIG. 14 shows spherical aberration, astigmatism, and distortion of the imaging lens in Numerical Example 7 according to the embodiment of the present invention.

FIG. 14 shows spherical aberration (mm), astigmatism (mm), and distortion (%) of the imaging lens in Numerical Example 7. As shown in FIG. 14, each aberration is corrected properly.

NUMERICAL EXAMPLE 8

The basic lens data of Numerical Example 8 is shown below in Table 8.

TABLE 8

Numerical Example 8 in mm f = 6.69
Fno = 1.7
ω(°) = 36.8

Surface Data

| Surface No. i | Curvature Radius r | Surface Distance d | Refractive Index Nd | Abbe Number v d | |
|---|---|---|---|---|---|
| (Object Surface) | Infinity | Infinity | | | |
| 1 (Stop) | Infinity | −0.705 | | | |
| 2* | 3.172 | 0.960 | 1.544 | 55.57 | (=v d1) |
| 3* | 99.000 | 0.150 | | | |
| 4* | 3.826 | 0.311 | 1.635 | 23.97 | (=v d2) |
| 5* | 2.399 | 0.673 | | | |
| 6* | 11.979 | 0.919 | 1.535 | 55.66 | (=v d3) |
| 7* | −32.041 | 0.050 | | | |
| 8* | −25.290 | 0.718 | 1.614 | 25.58 | (=v d4) |
| 9* | 27.962 | 0.472 | | | |
| 10* | −13.331 | 0.728 | 1.535 | 55.66 | (=v d5) |
| 11* | −2.924 | 0.030 | | | |
| 12* | Infinity | 1.200 | 1.535 | 55.66 | (=v dN) |
| 13* | Infinity | 0.588 | | | |
| 14* | −99.000 | 0.664 | 1.535 | 55.66 | (=v d6) |
| 15* | 2.965 | 0.340 | | | |
| 16 | Infinity | 0.210 | 1.517 | 64.20 | |
| 17 | Infinity | 0.696 | | | |
| Image Plane | Infinity | | | | |

| Constituent Lens Data | | | Composite Focal Length | |
|---|---|---|---|---|
| Lens | Start Surface | Focal Length | Lens | Focal Length |
| 1 | 2 | 6.01 | 1, 2, 3 | 7.10 |
| 2 | 4 | −11.06 | 4, 5 | 9.21 |
| 3 | 6 | 16.42 | Entrance Pupil Diameter | 3.91 |
| 4 | 8 | −21.51 | | |
| 5 | 10 | 6.84 | | |
| 6 | 14 | −5.37 | | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.433E−03 | 1.677E−03 | −3.749E−02 | −4.502E−02 | −2.790E−03 | −5.335E−03 | −1.572E−02 |
| A6 | −6.158E−04 | 1.392E−03 | 1.283E−02 | 1.368E−02 | −1.851E−03 | −2.975E−03 | 1.064E−04 |
| A8 | 2.641E−04 | −2.509E−04 | −2.525E−03 | −2.961E−03 | 2.349E−04 | 4.844E−05 | 2.704E−04 |
| A10 | −1.513E−05 | 5.799E−07 | 1.587E−04 | 2.885E−04 | −8.988E−05 | −1.220E−05 | 0.000E+00 |
| A12 | 0.000E+00 | 0.000E+00 | 0.000E+00 | −3.652E−06 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |
| | 9th Surface | 10th Surface | 11th Surface | 12th Surface | 13th Surface | 14th Surface | 15th Surface |
| k | 0.000E+00 | 0.000E+00 | −2.130E+00 | 0.000E+00 | 0.000E+00 | 0.000E+00 | −6.123E+00 |
| A4 | −1.262E−02 | −3.529E−03 | 4.523E−03 | 7.035E−03 | 1.021E−02 | −2.533E−02 | −1.954E−02 |

TABLE 8-continued

Numerical Example 8

| | | | | | | | |
|---|---|---|---|---|---|---|---|
| A6  | 2.755E−05 | 2.704E−03 | 1.639E−03 | −8.002E−04 | −4.684E−03 | 1.013E−03 | 2.462E−03 |
| A8  | 1.779E−04 | −9.420E−04 | −5.554E−04 | −9.971E−04 | 8.945E−04 | 3.874E−04 | −2.256E−04 |
| A10 | 0.000E+00 | 7.961E−05 | 4.238E−05 | 3.042E−04 | −1.131E−04 | −5.226E−05 | 1.384E−05 |
| A12 | 0.000E+00 | 0.000E+00 | 0.000E+00 | −4.121E−05 | 8.819E−06 | 2.669E−06 | −4.734E−07 |
| A14 | 0.000E+00 | 0.000E+00 | 0.000E+00 | 2.055E−06 | −3.843E−07 | −5.735E−08 | 6.592E−09 |
| A16 | 0.000E+00 | 0.000E+00 | 0.000E+00 | 0.000E+00 | 7.255E−09 | 3.540E−10 | 0.000E+00 |

In this example, the aberration correction optical element NE is located between the fifth lens L5 and the sixth lens L6.

As shown below, the imaging lens in Numerical Example 8 satisfies the conditional expressions (1) to (5) and the conditional expressions (7) to (18).

$$TN/f = 0.27 \quad (1)$$

$$dN/f = 0.18 \quad (2)$$

$$vdN = 55.66 \quad (3)$$

$$f/EPD = 1.7 \quad (4)$$

$$f123/f = 1.06 \quad (5)$$

$$|f4|/f5 = 3.15 \quad (7)$$

$$f6/f = -0.8 \quad (8)$$

$$vd1 - vd2 = 31.6 \quad (9)$$

$$vd3 = 55.66 \quad (10)$$

$$|vd4 - vd5| = 30.09 \quad (11)$$

$$vd6 = 55.66 \quad (12)$$

$$f1/f = 0.90 \quad (13)$$

$$(r1 + r2)/(r1 - r2) = -1.07 \quad (14)$$

$$(r3 + r4)/(r3 - r4) = 4.36 \quad (15)$$

$$(r11 + r12)/(r11 - r12) = 0.94 \quad (16)$$

$$f123/f45 = 0.77 \quad (17)$$

$$f45/f6 = -1.71. \quad (18)$$

Figure 16:
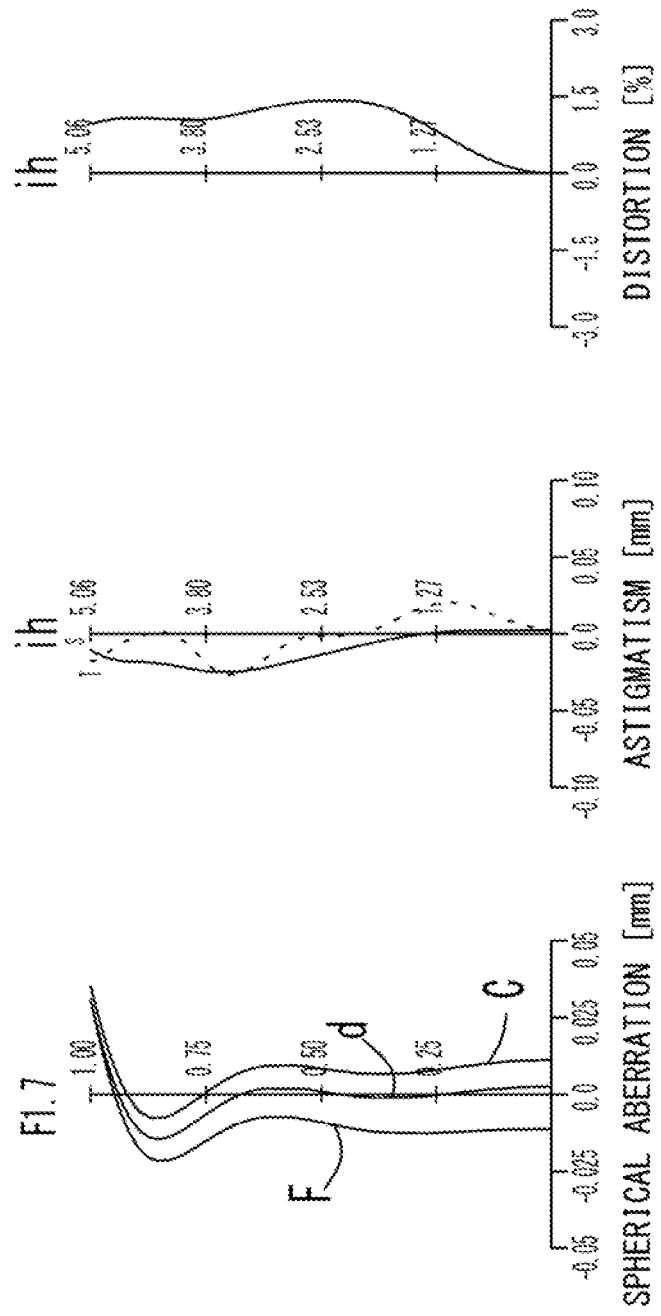
FIG. 16 shows spherical aberration, astigmatism, and distortion of the imaging lens in Numerical Example 8 according to the embodiment of the present invention.

FIG. 16 shows spherical aberration (mm), astigmatism (mm), and distortion (%) of the imaging lens in Numerical Example 8. As shown in FIG. 16, each aberration is corrected properly.

As explained above, the imaging lenses composed of seven optical elements in the numerical examples according to this embodiment of the present invention provide a low-profile optical system with a short total track length, though they use a total of seven elements: six lenses with refractive power and one aberration correction optical element with virtually no refractive power. Specifically, the total track length is 90% or less of the diameter of the effective image circle (diagonal length of the effective imaging plane of the image sensor), achieving low-profileness. In addition, the imaging lenses offer a wide field of view of 70 degrees or more and brightness with an F-value of 2.4 or less, and correct various aberrations properly and can be manufactured at low cost.

When any one of the imaging lenses composed of seven optical elements in the numerical examples according to this embodiment of the present invention is used in the image pickup device mounted in an increasingly compact and low-profile mobile terminal such as a smartphone, mobile phone or PDA (Personal Digital Assistant), or a game console or an information terminal such as a PC, or a home appliance with a camera function, it contributes to the compactness of the image pickup device and provides high camera performance.

The effects of the present invention are as follows.

According to the present invention, there is provided a compact low-cost imaging lens which meets the demand for low-profileness, offers a wide field of view and high brightness and corrects various aberrations properly.

What is claimed is:

1. An imaging lens which forms an image of an object on a solid-state image sensor, the imaging lens comprising:
   a first optical element that is a first lens having positive refractive power and a convex object-side surface;
   a second optical element that is a second lens that is a meniscus lens having negative refractive power and a concave image-side surface;
   a third optical element that is a third lens having positive or negative refractive power and at least one aspheric surface;
   a fourth optical element that is a fourth lens having positive or negative refractive power and at least one aspheric surface;
   a fifth optical element that is a fifth lens having positive or negative refractive power and at least one aspheric surface;
   a sixth optical element that is a sixth lens that is a double-sided aspheric lens having positive or negative refractive power and a concave image-side surface with an aspheric shape, the image-side surface of the sixth lens having pole-change points separated from an optical axis of the imaging lens; and
   a seventh optical element that is one double-sided aspheric aberration correction optical element with virtually no refractive power located between the first lens and an image plane,
   wherein the first through sixth optical elements are arranged sequentially from an object side to an image side of the imaging lens, and
   conditional expressions (1) to (3) below are satisfied:

$$0.05 < TN/f < 0.35 \quad (1)$$

$$0.03 < dN/f < 0.25 \quad (2)$$

$$45 < vdN < 65 \quad (3)$$

where
   f is an overall focal length of the imaging lens,
   TN is a distance on the optical axis between lenses where the seventh optical element is located,
   dN is a thickness of the seventh optical element on the optical axis, and vdN is an Abbe number of the seventh optical element at d-ray.

2. The imaging lens according to claim 1, wherein the seventh optical element is located between the first lens and the second lens.

3. The imaging lens according to claim 1, wherein the seventh optical element is located between the second lens and the third lens.

4. The imaging lens according to claim 1, wherein the seventh optical element is located between the third lens and the fourth lens.

5. The imaging lens according to claim 1, wherein the seventh optical element is located between the fourth lens and the fifth lens.

6. The imaging lens according to claim 1, wherein the seventh optical element is located between the fifth lens and the sixth lens.

7. The imaging lens according to claim 1, wherein the seventh optical element is located between the sixth lens and the image plane.

8. The imaging lens according to claim 1, wherein a conditional expression (4) below is satisfied:

$$f/EPD<2.40 \quad (4)$$

where
EPD is an entrance pupil diameter.

9. The imaging lens according to claim 1,
wherein there are no intervening lenses between the first lens and the second lens, the second lens and the third lens, and the fourth lens and the fifth lens,
composite refractive power of the first lens, the second lens, and the third lens is positive,
composite refractive power of the fourth lens and the fifth lens is positive, and
the refractive power of the sixth lens is negative.

10. The imaging lens according to claim 1,
wherein there are no intervening lenses between the first lens and the second lens, and the second lens and the third lens, and
a conditional expression (5) below is satisfied:

$$0.5<f123/f<2.0 \quad (5)$$

where
f123 is a composite focal length of the first lens, the second lens, and the third lens.

11. The imaging lens according to claim 1, wherein the fourth lens has positive refractive power, the fifth lens has negative refractive power, and a conditional expression (6) below is satisfied:

$$2.0<|f5|/f4<10.0 \quad (6)$$

where
f4 is a focal length of the fourth lens, and
f5 is a focal length of the fifth lens.

12. The imaging lens according to claim 1, wherein the fourth lens has negative refractive power and the fifth lens has positive refractive power, and a conditional expression (7) below is satisfied:

$$0.5<|f4|/f5<5.0 \quad (7)$$

where
f4 is a focal length of the fourth lens, and
f5 is a focal length of the fifth lens.

13. The imaging lens according to claim 1, wherein a conditional expression (8) below is satisfied:

$$-1.2<f6/f<-0.5 \quad (8)$$

where
f6 is a focal length of the sixth lens.

14. The imaging lens according to claim 1, wherein conditional expressions (9) to (12) below are satisfied:

$$25<vd1-vd2<40 \quad (9)$$

$$45<vd3<65 \quad (10)$$

$$20<|vd4-vd5|<40 \quad (11)$$

$$45<vd6<65 \quad (12)$$

where
vd1 is an Abbe number of the first lens at d-ray,
vd2 is an Abbe number of the second lens at d-ray,
vd3 is an Abbe number of the third lens at d-ray,
vd4 is an Abbe number of the fourth lens at d-ray,
vd5 is an Abbe number of the fifth lens at d-ray, and
vd6 is an Abbe number of the sixth lens at d-ray.

15. The imaging lens according to claim 1, wherein conditional expressions (13) and (14) below are satisfied:

$$0.5<f1/f<1.5 \quad (13)$$

$$-1.6<(r1+r2)/(r1-r2)21 -0.5 \quad (14)$$

where
f1 is a focal length of the first lens,
r1 is a curvature radius of the object-side surface of the first lens, and
r2 is a curvature radius of an image-side surface of the first lens.

16. The imaging lens according to claim 1, wherein a conditional expression (15) below is satisfied:

$$2.0<(r3+r4)/(r3-r4) <10.0 \quad (15)$$

where
r3 is a curvature radius of an object-side surface of the second lens, and
r4 is a curvature radius of the image-side surface of the second lens.

17. The imaging lens according to claim 1, wherein a conditional expression (16) below is satisfied:

$$-0.8<(r11+r12)/(r11-r12) <1.50 \quad (16)$$

where
r11 is a curvature radius of an object-side surface of the sixth lens, and
r12 is a curvature radius of the image-side surface of the sixth lens.

18. The imaging lens according to claim 1,
wherein there are no intervening lenses between the first lens and the second lens, the second lens and the third lens, and the fourth lens and the fifth lens,
conditional expressions (17) and (18) below are satisfied:

$$0.02<f123/f45<1.5 \quad (17)$$

$$-22.0<f45/f6<-1.0 \quad (18)$$

where
f123 is a composite focal length of the first lens, the second lens, and the third lens,
f45 is a composite focal length of the fourth lens and the fifth lens, and
f6 is a focal length of the sixth lens.

* * * * *